(12) United States Patent
Giladi

(10) Patent No.: US 10,880,550 B2
(45) Date of Patent: Dec. 29, 2020

(54) SYSTEMS AND METHODS FOR COMPRESSING VIDEO

(71) Applicant: Comcast Cable Communications, LLC, Philadelphia, PA (US)

(72) Inventor: Alexander Giladi, Princeton, NJ (US)

(73) Assignee: Comcast Cable Communications, LLC, Philadelphia, PA (US)

(*) Notice: Subject to any disclaimer, the term of this patent is extended or adjusted under 35 U.S.C. 154(b) by 0 days.

(21) Appl. No.: 16/376,781

(22) Filed: Apr. 5, 2019

(65) Prior Publication Data

US 2019/0313103 A1 Oct. 10, 2019

Related U.S. Application Data

(60) Provisional application No. 62/653,970, filed on Apr. 6, 2018.

(51) Int. Cl.
| | |
|---|---|
| *H04N 19/179* | (2014.01) |
| *H04N 19/87* | (2014.01) |
| *H04N 19/105* | (2014.01) |
| *H04N 19/142* | (2014.01) |
| *H04N 19/159* | (2014.01) |
| *H04N 19/172* | (2014.01) |
| *H04N 19/517* | (2014.01) |
| *H04N 19/577* | (2014.01) |
| *H04N 19/107* | (2014.01) |

(52) U.S. Cl.
CPC ......... *H04N 19/142* (2014.11); *H04N 19/105* (2014.11); *H04N 19/159* (2014.11); *H04N 19/172* (2014.11); *H04N 19/179* (2014.11); *H04N 19/517* (2014.11); *H04N 19/577* (2014.11); *H04N 19/87* (2014.11); *H04N 19/107* (2014.11)

(58) Field of Classification Search
CPC .......................... H04N 19/142; H04N 19/105
See application file for complete search history.

(56) References Cited

U.S. PATENT DOCUMENTS

| | | | | |
|---|---|---|---|---|
| 8,879,635 B2 * | 11/2014 | Raveendran | ............. | H04N 5/21 375/240.24 |
| 9,066,081 B2 * | 6/2015 | Chujoh | ................ | H04N 19/107 |
| 9,462,291 B2 * | 10/2016 | Tanizawa | ............... | H04N 19/44 |
| 9,628,788 B2 * | 4/2017 | Zheng | .................... | H04N 19/70 |
| 9,767,849 B2 * | 9/2017 | Lowe | .................... | G06F 9/5066 |
| 9,773,508 B2 * | 9/2017 | Lowe | ................... | G11B 27/038 |
| 9,779,736 B2 * | 10/2017 | Lowe | ..................... | G10L 19/00 |

(Continued)

OTHER PUBLICATIONS

Dong Tian et al: "Coding of faded scene transitions", International Conference on Image Processing (ICIP), IEEE, vol. 2, Sep. 22, 2002, pp. 505-508, XP010608019.

*Primary Examiner* — Irfan Habib
(74) *Attorney, Agent, or Firm* — BakerHostetler

(57) ABSTRACT

Systems, methods, and apparatuses are described for compressing digital content. The digital content may comprise a plurality of frames. The plurality of frames may comprise a plurality of crossfade frames. A first boundary frame of the crossfade frames may be determined. A second boundary frame of the crossfade frames may be determined. At least a portion of the crossfade frames may be coded as interpredicted frames using a weighting factor and based on the first boundary frame or the second boundary frame.

20 Claims, 9 Drawing Sheets

(56) References Cited

U.S. PATENT DOCUMENTS

| | | | |
|---|---|---|---|
| 10,102,613 B2* | 10/2018 | Kopp | H04N 19/117 |
| 10,271,061 B2* | 4/2019 | Tanizawa | H04N 19/44 |
| 2006/0093038 A1* | 5/2006 | Boyce | H04N 19/142 |
| | | | 375/240.16 |

* cited by examiner

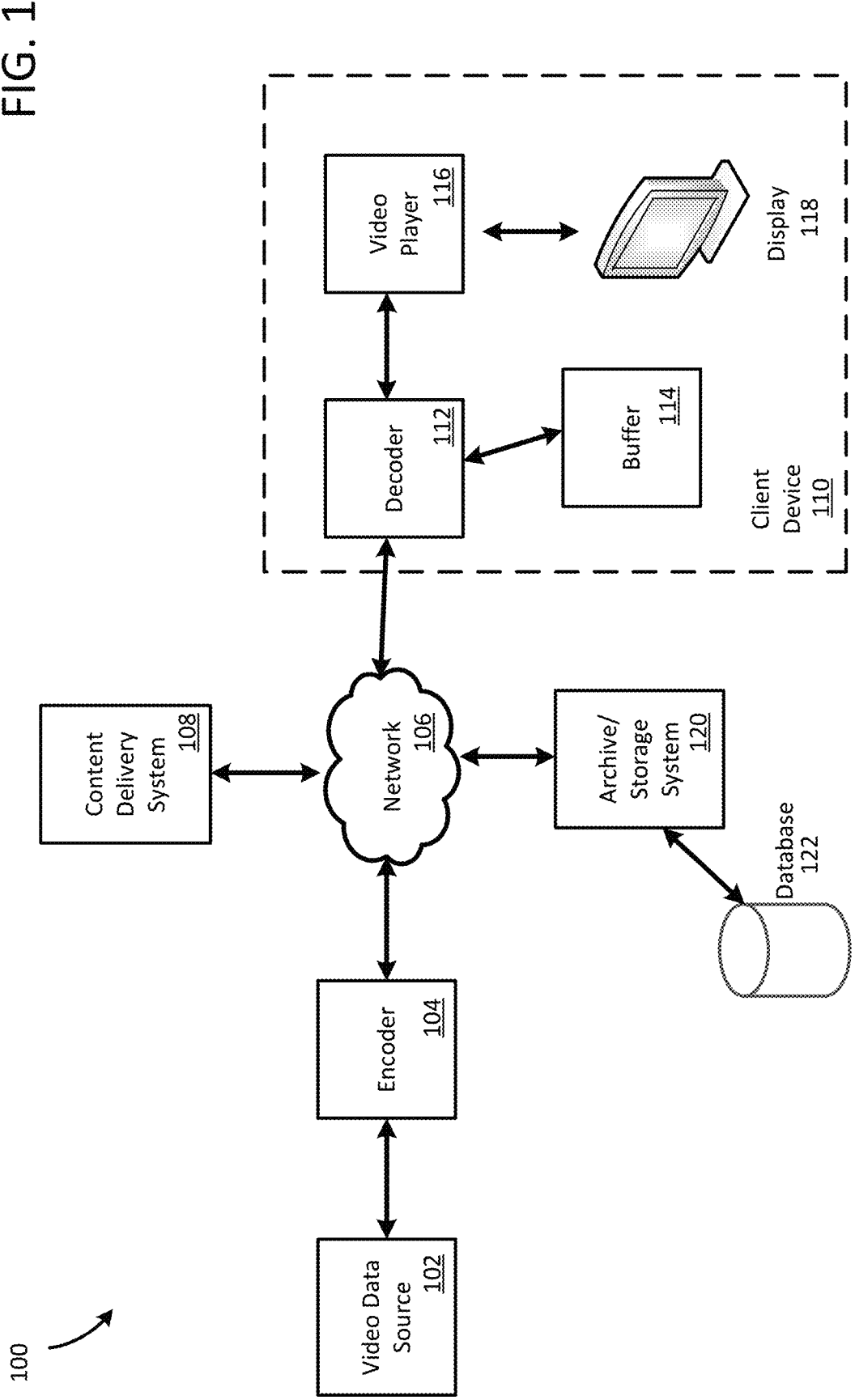

Pixel data in uncompressed
video frame (30-bit)   200

Pixel data in corresponding
compressed video frame   210

SYSTEMS AND METHODS FOR COMPRESSING VIDEO

CROSS REFERENCE TO REALTED APPLICATIONS

This application claims the benefit of U.S. Provisional Application No. 62/653,970 filed Apr. 6, 2018, which is hereby incorporated by reference in its entirety.

BACKGROUND

A user device may request video from a video source. The video may be compressed (e.g., encoded, coded, processed, etc.) to reduce a data size of the video prior to transmission to the user device. An encoder may determine how to compress a frame of the video based on calculating data sizes of the frame as different types of encoded frames to determine which type will be the smallest in data size. For example, the encoder may calculate and compare a data size of the frame encoded as an inter-predicted frame and a data size of the frame encoded as an intra-coded frame. Current methods of determining how to compress a frame, such as by calculating data sizes of frames as different types of encoded frames, may consume significant central processing unit (CPU) resources, such as time or power. Improvements in coding frames are needed.

SUMMARY

Systems and methods are described for compressing video. Video content may comprise a plurality of frames. The frames may comprise a plurality of crossfade frames showing a transition from a first scene to a second scene. The crossfade frames may comprise a first boundary frame showing the first scene and a second boundary frame showing the second scene. The crossfade frames may comprise transition frames between the boundary frames showing successive stages of the transition from the first scene to the second scene. Scenes may show content or may show a fade-to-black, fade out, or other transition.

A device, such as a scene change detector and/or an encoder, may be configured to receive a plurality of frames of a video comprising a plurality of crossfade frames. The crossfade frames may be determined. An indication of the crossfade frames may be sent, such as from a scene change detector to an encoder. The crossfade frames may be coded based on at least the indication of the crossfade frames. For example, the crossfade frames may be coded as inter-predicted frames that are using a weighting factor and based on a first boundary frame and/or a second boundary frame of the crossfade frames.

BRIEF DESCRIPTION OF THE DRAWINGS

The following drawings show generally, by way of example, but not by way of limitation, various examples discussed in the present disclosure. In the drawings:

FIG. 1 shows an example operating environment.

DETAILED DESCRIPTION

Figure 2A:
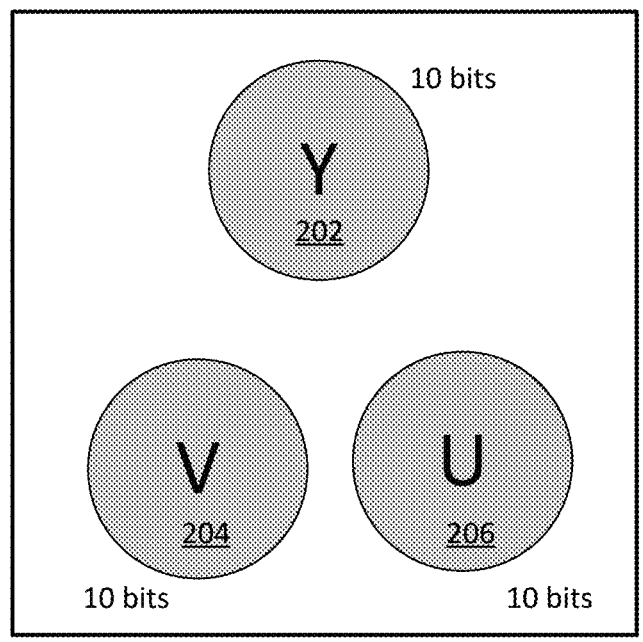
FIG. 2A shows example pixel data.

Systems and methods are described for compressing video. Dynamically and efficiently encoding video during a crossfade between scenes, a scene cut, or a flash frame is described. Video may comprise video frames or pictures. Video frames may comprise pixels. A pixel may be a smallest controllable element of a video frame. A video frame may comprise bits associated with the pixels. A pixel may have a luma (e.g., light intensity) value and/or a chrominance (e.g., color) value. Although the systems and methods are described with respect to frames or pictures, the systems and methods may be applied to slices and tiles, as well. For example, the disclosed methods and systems may be applied to slices and tiles as defined in ITU-T, H.264, and H.265

In order to reduce an amount of video data sent from one location to another, the video may be compressed using a compression technique (such as ITU-T H.262, H.263, H.264, H.265, VC-1, VC-2, VP-8, VP-9, AV1, etc.) prior to transmission. The compressed video may be decompressed and output.

A crossfade may comprise a scene change. A crossfade may comprise a transition between a first scene and a subsequent second scene. A crossfade may comprise one scene appearing to gradually disappear and another scene gradually appearing. The crossfade frames may each show at least a portion of the first scene and the second scene.

A crossfade may be determined prior to encoding or as part of an encoding process. An encoder may be configured to determine predictive weighting factors for frames of the crossfade. The weighting factors may be based on a sequence of the crossfade frames. For example, to determine weights for a crossfade frame, a greater weighting factor may be determined for a reference frame that is closer to the crossfade frame in the sequence than another reference frame.

Motion vectors referencing the first boundary frame and/or the second boundary frame may be scaled by the weighting factors. A motion vector may comprise an indication of a location of a block of pixels (e.g., a macroblock) in the reference frame and a location of a block pixels in the frame to be encoded. The motion vector may comprise a two-dimensional vector. The motion vector may comprise a format associated with a video compression technique, such as ITU-T H.262, H.263, H.264, H.265, VC-1, VC-2, VP-8, VP-9, and AV1, as examples. Depending on the compression technique being used, the motion vector may reference one or more reference frames. For example, the H.264 and H.265 compression techniques allow a frame to be inter-predicted by generating two or more motion vectors, each of which may reference a different reference frame. A motion vector referencing the first boundary frame may be scaled by the weighting factor determined for the first boundary frame. A motion vector referencing the second boundary frame may be scaled by the weighting factor determined for the second boundary frame. A motion vector referencing another frame of the content asset or of the crossfade frames may be scaled by a weighting factor determined for the frame. A motion vector for a macroblock of the frame being encoded may comprise a sum or average of the weighted motion vector referencing the first boundary frame and the weighted motion vector referencing the second boundary frame. A macroblock may comprise a block within a picture, elements within the quadtree structure of the coding tree unit (CTU), such as prediction unit (PU) as described in the ITU-T H.265 standard, or to predictions blocks as described in ITU-T and H.264. The crossfade frames may be determined, such as by a scene change detector and/or an encoder. Based on a plurality of frames comprising crossfade frames, the encoder may be configured to determine not to encode a portion or all of the frames as intra-coded frames (I-frames). Based on a plurality of frames comprising crossfade frames, the encoder may be configured to determine to encode one or more of the crossfade frames as inter-predicted frames. Determining not to encode the frames as intra-coded frames and/or determining to encode the frames as inter-predicted frames may preclude estimating the data sizes of the frames as encoded frame types, such the frames encoded as intra-coded frames and/or the frames encoded as inter-predicted frames. Bypassing the step of estimating the data sizes of the frames as encoded frame types may conserve central processing unit (CPU) resources, such as time or power used to estimate the data sizes of the frames as encoded frame types.

The inter-predicted frames may reference boundary frames. Coding the crossfade frames as inter-predicted frames, rather than coding each crossfade frame as a reference frame may reduce the amount of data sent to a decoder. Coding the crossfade frames as inter-predicted frames, rather than coding each crossfade frame as a reference frame may improve the quality of video decoded and output. For example, the frames coded as inter-predicted frames may have a smaller data size than the frames coded as intra-coded frames. The conservation in data size may enable reallocation of data to other frames of the content asset. The other frames may be coded using an encoded frame type that has a greater data size, based on the crossfade frames being encoded as inter-predicted frames, while remaining within a maximum data size of transmission of the frames of the content asset.

CPU resources may be conserved by determining a plurality of crossfade frames of a plurality of frames of video content. A detector, such as a scene change detector, may be in communication with the encoder. The detector and the encoder may comprise two modules on a single device. The detector may comprise a component and/or a module of the encoder. The detector may comprise a first device and the encoder may comprise a second device. The detector may be implemented as a logical component of the encoder. The detector may be configured to determine that the plurality of frames comprise crossfade frames.

The detector, encoder, and/or another component may determine the crossfade frames. For example, the crossfade frames may be determined by comparing histograms associated with pixels or blocks of pixels within successive frames. The histograms may represent color space components, such as intensity, chrominance (chroma), luminance, or luma (e.g., YCbCr, ICtCp, HSV, or CIE 1976 (L*, u*, v*) values. The histograms may represent the number of pixels for which the histogram was computed. The histograms may comprise bins each associated with a color space component or a combination of color space components. The histogram may comprise an indication of a number of pixels having the value associated with each of the bins. Bins of a histogram may correspond to color space components (e.g., intensity, chrominance (chroma), luminance, or luma) of a frame. Bin values of a histogram may correspond to a number of pixels of the frame associated with each of the bins. For example, the bins may be indicated on a first axis of a histogram and the number of pixels associated with each of the bins may be indicated on a second axis of the histogram.

By comparing the histograms, the detector may determine a series of frames that show a sharp and/or a gradual transition between scenes within the video sequence. The bin values associated with each of the bins of a histogram may be compared to the bin values or the number of pixels associated with each of the bins of another histogram. If the difference in bin values between one or more frames meets or exceeds a threshold value, the one or more frames may be determined to comprise a scene change of a crossfade. The threshold value may comprise a value that is known to be associated with a scene change. For example, the threshold value may be based on a value or a range of values calculated using a known crossfade, flash frame, or scene cut. For example, histograms may be generated for frames known to comprise a crossfade, flash frame, or scene cut. Based on the generated histograms, bin values may be calculated. The threshold value may be determined based on the calculated bin values.

Comparing the histograms may comprise determining, using the histograms, the rate of change of the bin values over successive frames. For example, a large difference between histograms associated with consecutive frames may indicate a scene change. Constant differences between histograms associated with a sequence of frames may indicate a crossfade. Constant rates of change in difference between histograms associated with a sequence of frames may indicate a crossfade. If the rate of change of bin values over the frames meets or exceeds a threshold value, the one or more frames may be determined to comprise a scene change or a crossfade.

The detector may also determine the crossfade frames by comparing boundaries or edges of features shown in the frames. The detector may determine a flash frame by comparing boundaries or edges of features shown in the frames. A flash frame may comprise a sequence of frames having a change in illumination throughout the sequence of frames. The feature or an edge associated with the feature may remain consistent throughout the frames of the flash frame. The detector may determine the flash frame based on an edge remaining consistent throughout the frames.

A scene cut may comprise a sharp transition from a first scene to a second scene. For example, a scene cut may comprise a first frame showing a first scene and a second frame immediately preceding the first frame showing a second scene. The detector may distinguish a scene cut from a crossfade or a flash frame, such as based on a rate of change of the bin values and/or based on edges of the frames.

The detector may determine a first boundary frame and a second boundary frame of crossfade frames. The first boundary frame may comprise the last frame in the plurality of frames showing a complete scene leading to a crossfade (a first scene). A frame subsequent to the first boundary frame and adjacent to the first boundary frame may comprise data mostly associated with the first scene, but may show the first frame of the gradual transition to a second scene. The second boundary frame may comprise the first frame in the plurality of frames of the content asset showing the second scene.

The detector may send an indication of the crossfade frames to the encoder. For example, the detector may send an indication of the first boundary frame and the second boundary frame of the crossfade frames to the encoder. The detector may send an indication of one or more transition frames of the crossfade frames to the encoder. The detector may send an indication of frames of a scene cut to the encoder. The detector may send an indication of a flash frame to the encoder. Based on the indication, the encoder may not estimate the data size of one or more of the indicated frames encoded as encoded frame types.

The encoder may determine encoded frame types for encoding the crossfade frames. For example, the encoder may determine the encoded frame types for encoding the crossfade frames based on the received indication of the crossfade frames. The encoder may determine to encode the first boundary frame and/or the second boundary frame as reference frames. Reference frames may comprise frames that are configured to be used to inter-predict other frames or to be referenced by other encoded frames, such as with motion vectors. As another example, the encoder may determine to encode the first boundary frame and/or the second frame as intra-coded frames, such as I-frames. As another example, the coder may determine to encode the first boundary frame and/or the second boundary frame as inter-predicted frames. An inter-predicted frame may comprise a bi-directional inter-predicted frame (B-frame). A B-frame may reference one or more previous frames and/or a subsequent frames in the sequence of crossfade frames. An inter-predicted frame may comprise a P-frame. A P-frame may reference one or more previous frames of the sequence of crossfade frames. The detector may send an indication to the encoder to encode the first boundary frame and the second boundary frame as reference frames, inter-predicted frames, and/or intra-coded frames. Based on the indication, the encoder may determine an encoded frame type for encoding one or more of the indicated frames.

The encoder may determine how to encode transition frames between the first boundary frame and the second boundary frame in the sequence of the plurality of frames. For example, the encoder may determine how to encode transition frames between the first boundary frame and the second boundary frame in the sequence of the plurality of frames based on the indication of the boundary frames and/or the indication of the crossfade frames. The transition frames may show successive stages of the transition from the first scene to the second scene. The encoder may determine to encode the transition frames as inter-predicted frames. The encoder may determine to encode the transition frames as inter-predicted frames that reference one or more of the first boundary frame, the second boundary frame, and/or another transition frame. The reference may comprise a motion vector referencing one or more blocks of pixels of the first boundary frame, the second boundary frame, or another transition frame. The reference may comprise an indication of a motion-compensated difference from one or more blocks of pixels of the reference frame. For example, a transition frame may be coded as a B-frame that references another transition frame encoded as a P-frame.

The encoder may determine to remove one or more of the frames, such as to eliminate redundancy. For example, the encoder may determine to remove one or more of the frames based on the indication of the crossfade frames, scene cut frames, and/or flash frame. The encoder may determine to remove a frame that is similar to another frame. The encoder may determine to replace a frame with an indication that another frame is repeated (e.g., using the pic_struct field).

The encoder may use other information (e.g., instead of or in addition to the indication of the crossfade frames, scene cut frames, and/or flash frame) in determining an encoded frame type for encoding the frames, such as how many encoded frames are needed or a time at which the encoded bitstream will be sent to a decoder. The encoded bitstream may comprise access units containing information sufficient for the decoder to decode and render frames. The encoder may determine the encoded frame type based on a time at which the video will be decoded, a time at which the video will be output, and/or how the video will be output.

In determining how to encode crossfade frames as inter-predicted frames, the detector or the encoder may use a weighted prediction algorithm. The weighted prediction algorithm may be based on a sequence of the crossfade frames. The weighted prediction algorithm may be used to determine weighting factors. For example, the weighting factors may be determined based on a number of frames between the current frame being coded and the first boundary frame and/or the second boundary frame. The weighting factors may be determined based on a number of frames in the plurality of crossfade frames. The weighting factors may be determined based on a sequence of the crossfade frames. For example, the weighting factors may be determined based on a number of frames between an instant frame being coded and the first boundary frame and/or the second boundary frame. The weighting factors may be determined based on a number of frames in the plurality of crossfade frames.

For example, transition frames that are earlier in the sequence may be more similar to the first boundary frame. For example, P(0) may be the first boundary frame and P(1+N) may be the second boundary frame, where there are N transition frames in the crossfade. A frame P(1) may show a first stage in the transition from the first scene to the second scene. A frame P(N) may show the last stage in the transition from the first scene to the second scene. An image in frame P(1) may be more similar to an image of the first scene than an image of the second scene. For example, features in the frame P(1) may be more similar to features in the first scene than features in the second scene.

Motion vectors referencing the first boundary frame and/or the second boundary frame may be determined. The motion vectors may be scaled by the determined weighting factors. For example, if there are nine frames and seven transition frames in a crossfade, a fifth frame in the crossfade (e.g., frame P(5)) may inter-predicted using a motion vector referencing the first boundary frame P(0) and a motion vector referencing the second boundary frame P(9). A first weighting factor may be determined for a first motion vector referencing the first boundary frame. The first weighting factor may comprise 0.55, as an example. A second weighting factor may be determined for the second motion vector referencing the second boundary frame. The second weighting factor may comprise 0.45, as an example. The motion vectors may be scaled by the determined weighting factors. The frame may be inter-predicted using a motion vector that is a sum or a weighted average of the weighted first motion vector and the weighted second motion vector. For example, the fifth frame may be inter-predicted as 0.55 (the first motion vector)+0.45 (the second motion vector).

Determining how the crossfade frames should be inter-predicted may comprise determining to encode the frames as P-frames or B-frames. Determining how the crossfade frames should be inter-predicted may comprise determining motion vectors, macroblocks of the crossfade frames to indicate with the motion vectors, and/or macroblocks in a reference frame to reference with the motion vectors. Determining how the crossfade frames should be inter-predicted may comprise determining information to send to a decoder, such as motion compensation data and/or prediction errors.

Video content may comprise one or more frames showing an effect of a photographic flash or strobe. For example, a frame may show a flash of a camera at a news conference. The frame may show a strobe at a theatrical production or musical show. A flash frame may comprise a frame without color or with a uniform color. The detector or the encoder may determine the one or more flash frames. For example, the detector or the encoder may determine the one or more flash frames based on histograms associated with the one or more flash frames. The detector or the encoder may determine, based on the histograms, a confidence value. The confidence value may comprise a numeric value describing a probability or a degree of confidence that the one or more flash frames do not show scene changes.

The detector may send an indication of the flash frames to the encoder. Based on the indication of the flash frames, the encoder may not estimate or calculate data sizes of the flash frames as encoded frame types. The encoder may determine not to estimate or calculate the data sizes of the flash frames as intra-coded frames. The encoder may determine not to estimate the data sizes of the flash frames as inter-predicted frames.

The encoder may determine how to encode the one or more flash frames. For example, the encoder may determine how to encode the one or more flash frames based on the indication of the flash frames. The encoder may determine that the one of more flash frames should be removed, such as to eliminate redundancy among frames with similar illumination, frame components, and/or features shown. The encoder may remove the one or more flash frames. The encoder may determine to encode the flash frames as inter-predicted frames. The detector and/or the encoder may determine that the one or more flash frames should be used as a reference frame. The encoder may encode the one or more flash frames as inter-predicted frames. The encoder may encode one or more other frames as inter-predicted frames referencing one or more of the flash frames. Based on the indication, the encoder may predict a frame proceeding the flash frame. The frame proceeding the flash frame may show a feature after the flash event.

Determining how to encode frames based on a determination of a crossfade or a determination of a flash may improve the resource efficiency of video compression as well as address existing problems in video compression. For example, if the determination of how to encode frames is not based on a determination of a crossfade, an encoder may determine to encode a boundary frame of a crossfade as a predicted frame or to remove the boundary frame. If the boundary frame is not encoded as a reference frame, other frames of the crossfade may not reference the boundary frame, and the boundary frame may not be sent to a decoder device or an output device. Without the boundary frame, the other frames may be sub-optimally predicted. The sub-optimally predicted frames may result in output of video having an unclear or lagging appearance.

The detector may send an indication of the scene cut to the encoder. For example, the detector may send an indication of the scene cut to the encoder based on a determination that one or more frames comprise a scene cut. Based on the indication, the encoder may not estimate the data size of the frames as encoded frame types. The encoder may not estimate the data size of the frames as inter-predicted frames.

FIG. 1 shows an example operating environment 100. The operating environment 100 may comprise a video data source 102, an encoder 104, a network 106, a content delivery system 108, a client device 110, an archive/storage system 120, and/or a database 122. The video data source 102 may comprise a headend, a video on-demand server, a cable modem termination system, the like, and/or any combination of the foregoing. The video data source 102 may receive a request for video data from the content delivery system 108 and/or the client device 110. Video data may comprise a sequence of raw (uncompressed/unencoded) video frames. The content delivery system 108 may authorize/authenticate the request and/or the client device 110 from which the request originated. The video data source 102 may receive the request through a network 106. The network 106 may comprise a public network, such as the Internet. The network 106 may comprise a private network, such as a content provider's distribution system. The request for video data may comprise a request for a channel, a video on-demand asset, a website address, a video asset associated with a streaming service, the like, and/or any combination of the foregoing. The video data source 102 may send the requested video data to the encoder 104.

The encoder 104 may compress/encode the video data according to a compression technique. The compression technique may comprise maintaining the luma and/or chrominance bit values of the original video data in the compressed video data. The compression technique may comprise compressing the luma and/or chrominance bit values according to a compression standard. The compression standard may comprise ITU-T H.262, H.263, H.264, H.265, VC-1, VC-2, VP-8, VP-9, AV1, or another compression standard. The compression technique may comprise intra-frame encoding. The compression technique may comprise any combination of compression techniques described in the above standards. The algorithms used for motion estimation may include exhaustive and/or fast block-based motion estimation algorithms or motion flow The compressed/encoded video data may be routed from the encoder 104 via a network 106. The network 106 may comprise a public network, such as the Internet. The network 106 may comprise a private network, such as a content provider's distribution system. The compressed/encoded video data may be received at the archive/storage system 120. The archive/storage system 120 may store the compressed/encoded video data in the database 122. The compressed/encoded video data may be received at the client device 110.

The client device 110 may comprise a decoder 112, a buffer 114, a video player 116, and a display 118. The client device 110 may comprise a television, a monitor, a laptop, a desktop, a smart phone, a set-top box, a cable modem, a gateway, a tablet, a wearable computing device, a mobile computing device, any computing device configured to receive and/or playback video, the like, and/or any combination of the foregoing. The decoder 112 may decompress/decode the compressed/encoded video data. The luma and/or chrominance bit values of the decompressed/decoded video data from the decoder 112 may be identical to corresponding luma and/or chrominance bit values of the video data at the video data source 102. The decoder 112 may send the decompressed/decoded video data to the buffer 114 for storage. The decoder 112 may send the decompressed/decoded video data to the video player 116. The video player 116 may cause video associated with the decompressed/decoded video data to be displayed on the display 118.

FIG. 2A shows example pixel data in an uncompressed video frame 200. A first frame 200 may comprise luma (Y) bits 202 to control brightness associated with the first frame 200. Although shown with 10 bits, the luma bits 202 may comprise any number of bits. The first frame 200 may comprise first chrominance (V or Cb or Pb) bits 204 to control an aspect of a color associated with the first frame 200. Although shown with 10 bits, the first chrominance bits 204 may comprise any number of bits. The first frame 200 may comprise second chrominance (U or Cr or Pr) bits 206 to control another aspect of the color associated with the first frame 200. Although shown with 10 bits, the second chrominance bits 206 may comprise any number of bits. One or more of the luma bits 202, the first chrominance bits 204, and the second chrominance bits 206 may be used to identify a crossfade. One or more of the luma bits 202, the first chrominance bits 204, and the second chrominance bits 206 of a first boundary frame and/or a second boundary frame may be used to create transition frames of a crossfade.

Figure 2B:
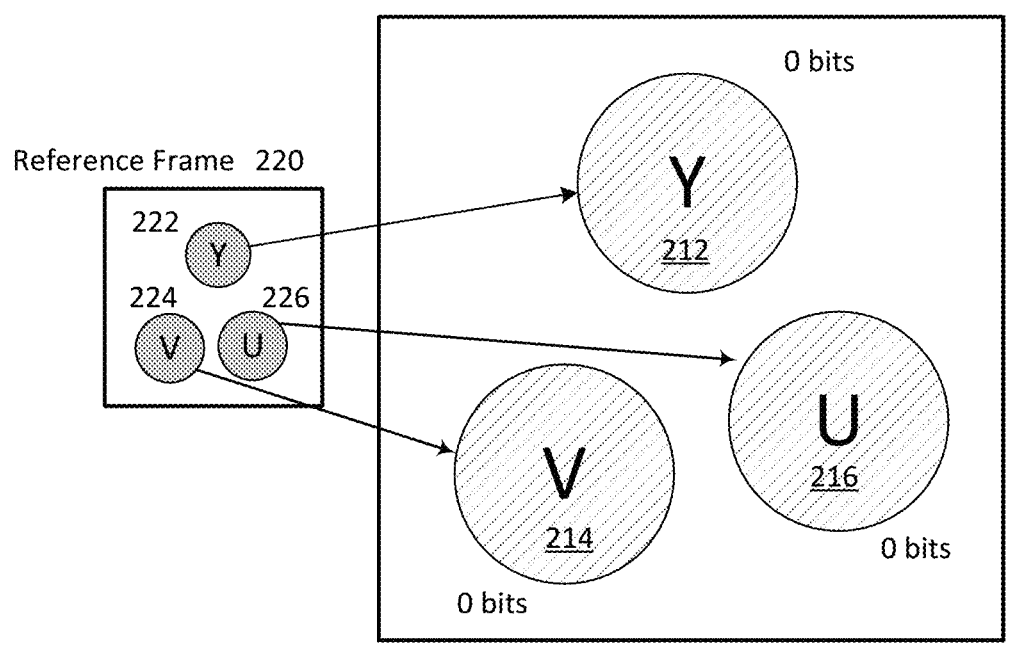
FIG. 2B shows example pixel data.

FIG. 2B shows example pixel data in a compressed video frame 210 that corresponds to the uncompressed video frame 200. A second frame 210 may use a third frame 220 as a reference frame. The third frame 220 may comprise first chrominance (V or Cb or Pb) bits 224 to control an aspect of a color associated with the third frame 220. The third frame 220 may comprise second chrominance (U or Cr or Pr) bits 226 to control another aspect of the color associated with the third frame 220. The third frame 220 may comprise luma (Y) bits 222 to control brightness associated with the third frame 220.

The second frame 210 may comprise a first chrominance reference 214 to the first chrominance bits 224 of the third frame 220. The first chrominance reference 214 may comprise less bits than the bits of the first chrominance 204 in the uncompressed video frame 200. For example, the first chrominance reference 214 may comprise zero bits. The second frame 210 may comprise a second chrominance reference 216 to the second chrominance bits 226 of the third frame 220. The second chrominance reference 216 may comprise less bits than the bits of the second chrominance 206 in the uncompressed video frame 200. For example, the second chrominance reference 216 may comprise zero bits. The second frame 210 may comprise a luma reference 212 to the luma bits 222 of the third frame 220. The luma reference 212 may comprise less bits than the bits of the luma 202 in the uncompressed video frame 200. For example, the luma 212 may comprise zero bits.

Although shown with a reference frame 220, a pixel, a block of pixels (macroblock), or any other unit of pixel data may be used as a reference. Although shown with a compressed reference frame 210, a pixel, a block of pixels, or any other unit of pixel data may refer to pixel data from another source. Although one source is used as a reference source, multiple sources may be used as reference sources. The first chrominance reference 214 may refer to chrominance bits at a first source (e.g., frame, pixel, block, etc.) and the second chrominance reference 216 may refer to chrominance bits at a second source (e.g., frame, pixel, block, etc.). Color space need not be adjusted to implement the disclosed techniques. A 4:2:0 color space may be used.

Figure 3:
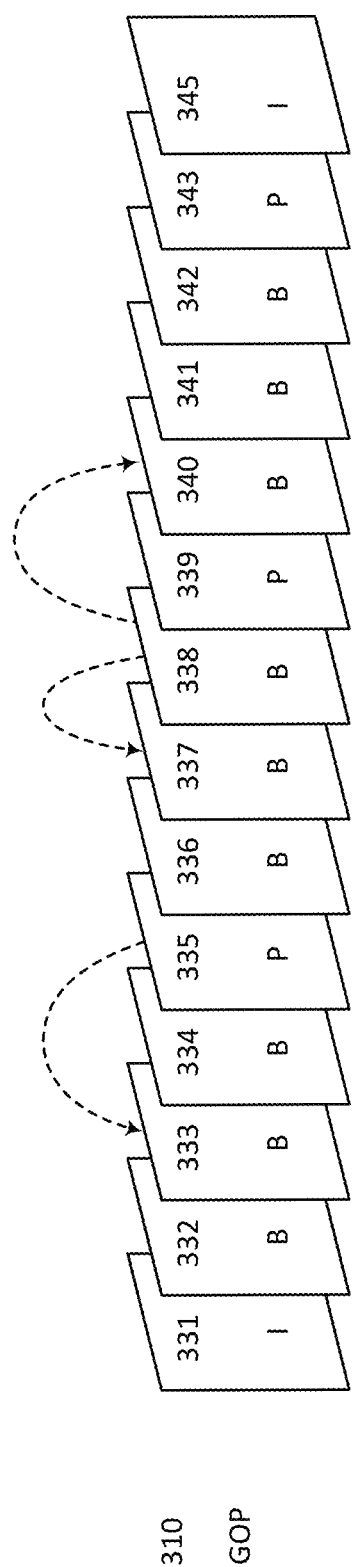
FIG. 3 shows an example Group of Pictures (GOP) structure.

FIG. 3 shows an example encoded group of pictures (GOP) 310. The GOP 310 may comprise I-frames 331, 345, P-frames (or P-pictures) 335, 339, 343, and B-frames (or B-pictures) 332, 333, 334, 336, 337, 338, 340, 341, 342. I-frames 331, 345 may be coded independently of other frames. For example, the I-frames 331, 345 may comprise data that is self-contained and does not reference another frame. The I-frames 331, 345 may be decoded independently of other frames. The GOP 310 may comprise a sequence of frames. The sequence of frames may begin with an I-frame 331. The sequence of frames may end with an I-frame 345.

P-frames 335, 339, 343 may be dependent on one or more previous frames in the sequence, such as by referencing the one or more previous frames. For example, P-frame 335 may be dependent on frame 333. B-frames 332, 333, 334, 336, 337, 338, 340, 341, 342 may be dependent one or more previous frames and/or one or more subsequent frames in the sequence. For example, B-frame 338 may be dependent on frame 337 and frame 340.

Encoding a frame may comprise determining a macroblock of another frame (e.g., a reference frame) that is similar to a macroblock of the instant frame, such as a macroblock having similar intensity, chroma, luma, and/or luminance to the instant macroblock. The macroblock of the other frame may be determined to be more similar to the macroblock of the instant frame than the other macroblocks in the other frame and in other frames of the video. For example, a macroblock in frame 333 may be determined to be a best match to a macroblock in frame 335. For example, a macroblock in frame 337 and/or a macroblock in frame 340 may be determined to be one or more best matches to a macroblock in frame 338.

One or more motion vectors may be determined for a macroblock. The macroblock may comprise a rectangular and/or square block of pixels. A rectangular and/or square block of pixels may have dimensions of 128×128, 64×64, 32×32, 16×16 or 8×8 pixels, as examples. The macroblock may comprise a non-square block of pixels, such as a block of pixels having dimensions of 8×16 or 16×32 pixels. A motion vector of a macroblock may reference a macroblock of another frame (e.g., a reference frame) that is determined to be a best match to the instant macroblock or that has similar intensity, chroma, luminance, and/or luma to the instant macroblock. The motion vector may comprise an indication of coordinates of the instant macroblock in the instant frame. The motion vector may comprise an indication of coordinates of the reference macroblock in the reference frame.

Motion compensation may be determined for a macroblock. Motion compensation may comprise determining a location of a macroblock in a frame based on a location of a macroblock in another frame. Motion compensation may be global (e.g., the whole frame is moving, such as based on a camera moving, etc.). Motion compensation may be local (e.g., an object within a frame is moving, such as based on a steady camera capturing an object moving, etc.). Frame coordinates of the location of the macroblock may be determined.

Figure 4:
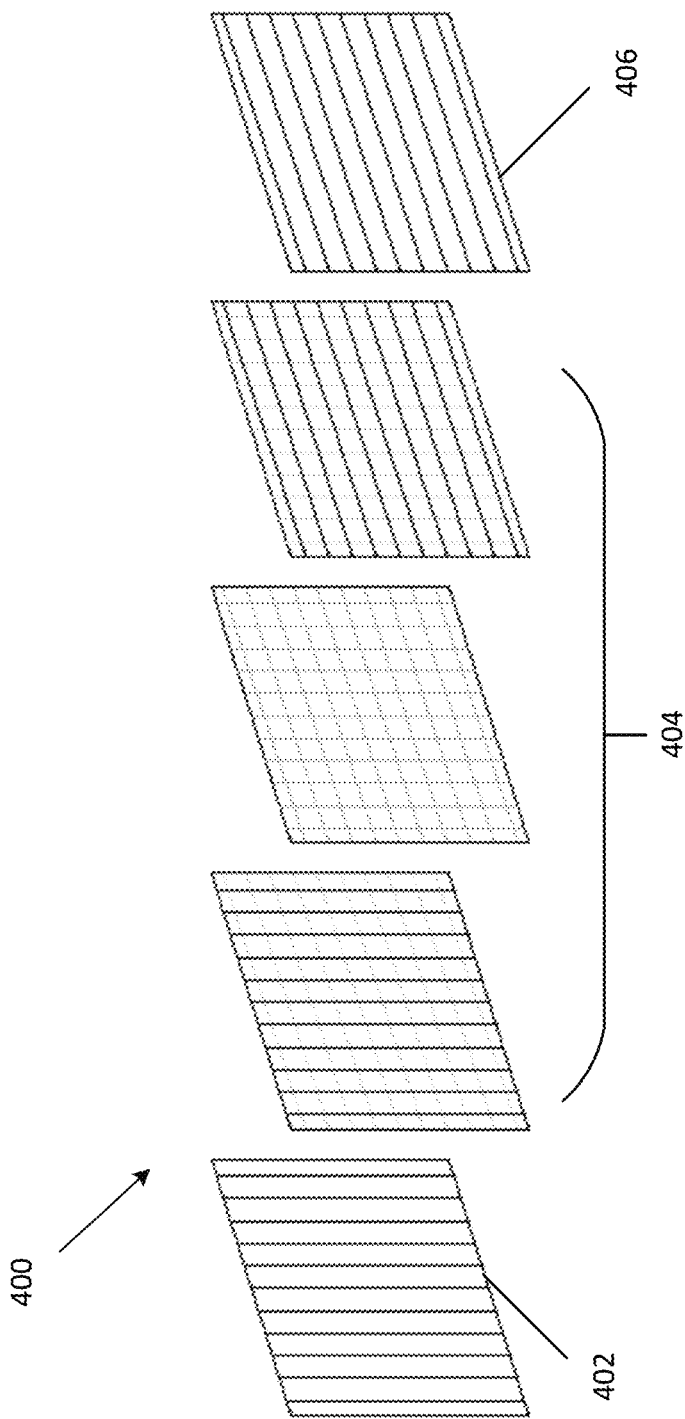
FIG. 4 shows example crossfade frames.

FIG. 4 shows example crossfade frames 400. The crossfade frames 400 may comprise a group of pictures (GOP) or a subset of a GOP of a video. The crossfade frames 400 may comprise frames of a video, such as live recorded video, non-live recorded video, animated video, or other digital video. The crossfade frames 400 may comprise a first boundary frame 402, a second boundary frame 406, and one or more crossfade transition frames 404. The first boundary frame 402 may be a last frame of a scene preceding a crossfade transition to a different scene. The second boundary frame 406 may be a first frame of the different a scene (e.g., the last frame of the crossfade transition and/or a first frame proceeding the transition frames). The crossfade transition frames 404 may show the transition from the first scene to the second scene. As shown in FIG. 4, the transition from the first scene to the second scene may comprise a dissolving effect, such the first scene appearing to dissolve to black or a uniform color and/or brightness. The second scene may gradually appear. The transition from the first scene to the second scene may comprise a direct transition from the first scene to the second scene, such as having the appearance of the first scene morphing into the second scene. The first boundary frame 402 and/or the second boundary frame 406 may be referenced by encoded transition frames 404.

The crossfade transition frames 404 may comprise image data from the first boundary frame 402 and/or the second boundary frame 406. The closer a crossfade transition frame 404 is to the first boundary frame 402 in a sequence of the crossfade frames, the more image data associated with the first boundary frame 402 the crossfade transition frame 404 may comprise. For example, the crossfade transition frame 404 immediately following the first boundary 402 may be the crossfade transition frame 404 with the most first boundary frame 402 image data. First boundary frame 402 image data may decrease in the crossfade transition frames 404 as the cross transition frames 404 are observed starting from the first boundary frame 402 and ending at the second boundary frame 406. The decrease in the first boundary frame 402 image data in the crossfade transition frames 404 may be at a constant (or near constant) rate as the cross transition frames 404 are observed starting from the first boundary frame 402 and ending at the second boundary frame 406.

The closer a crossfade transition frame 404 is to the second boundary frame 406 in the sequence of frames, the more image data associated with the second boundary frame 406 the crossfade transition frame 404 may comprise. The crossfade transition frame 404 immediately preceding the second boundary 406 may be the crossfade transition frame 404 with the most second boundary frame 406 image data. Second boundary frame 406 image data may increase in the crossfade transition frames 404 as the crossfade transition frames 404 are observed starting from the first boundary frame 402 and ending the second boundary frame 406. The increase in the second boundary frame 406 image data in the crossfade transition frames 404 may be at a constant (or near constant) rate as the cross transition frames 404 are observed starting from the first boundary frame 402 and ending at the second boundary frame 406. The crossfade transition frame 404 may be at (or close to) a midpoint, and may comprise a same (or approximately a same) amount of first boundary frame 402 image data as second boundary frame 406 image data.

Although FIG. 4 shows the crossfade frames 400 comprising video frames, the crossfade frames 400 may comprise frames or segments of a different type of media, such as audio. For example, an audio crossfade may comprise a gradual transition from a first part of audio content to a second part of the audio content over successive segments of the audio content. The described methods may be used to encode frames or segments of the different type of media. For example, an audio crossfade may be determined based on key, tone, pitch, and/or volume of the segments.

Figure 5:
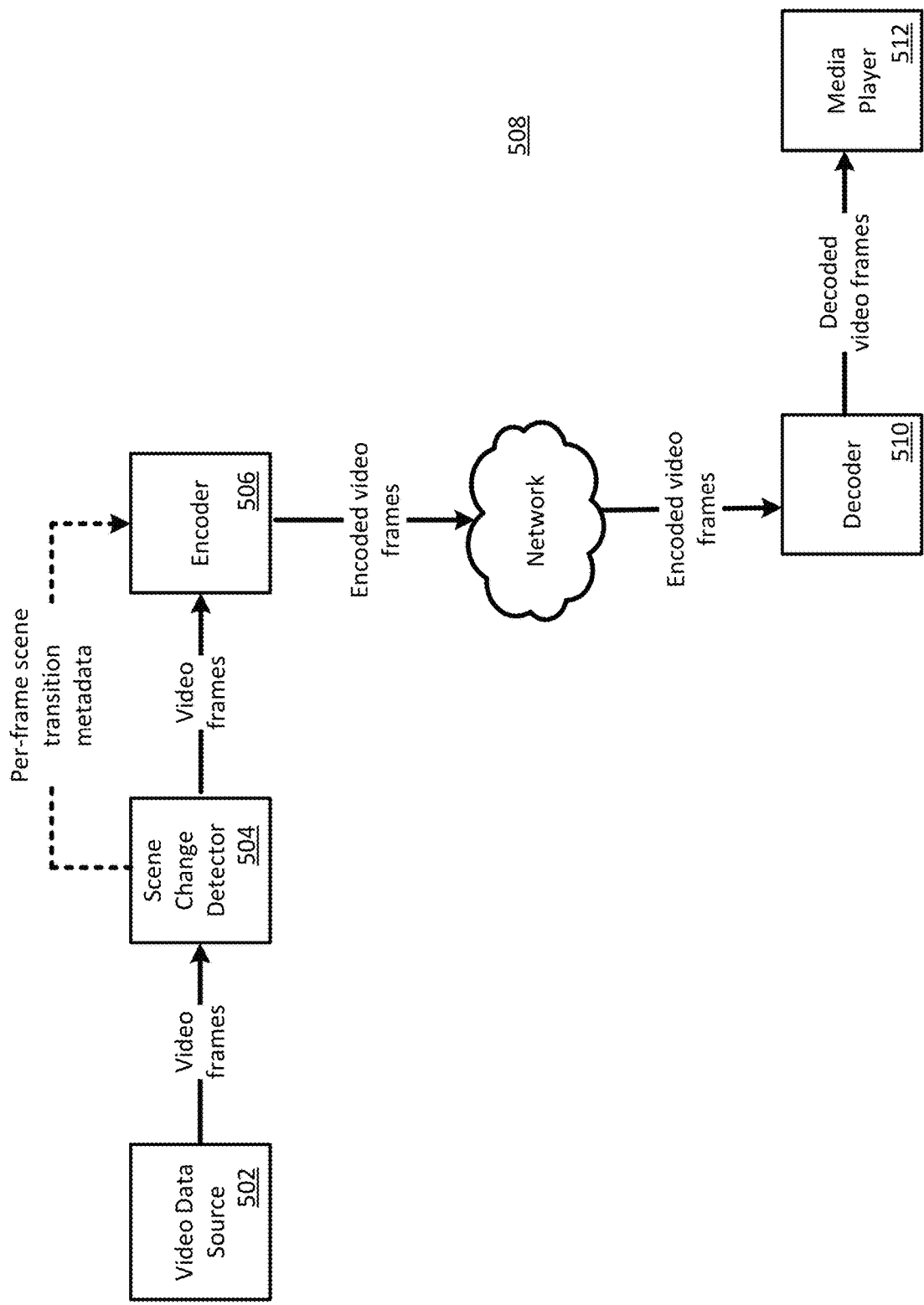
FIG. 5 shows an example system environment.

FIG. 5 shows an example system environment. A video data source 502 may send a video asset to a scene change detector 504. The video data source 502 may comprise a headend, a video on-demand server, a cable modem termination system, the like, and/or any combination of the foregoing. The video data source 502 may send raw (e.g., uncompressed, un-encoded, etc.) video frames of the video asset to the scene change detector 504. The scene change detector 504, may review the frames to determine scene changes, such as crossfades between scenes. The scene change detector 504 may send video frames to an encoder 506. The scene change detector 504 may send an indication of determined scene changes to the encoder 506, such as in the form of metadata associated with one or more of the video frames.

The encoder 506 may encode the video frames. The encoder 506 may send the encoded video frames to a decoder 510 via a network 508. The network 508 may comprise a public network, such as the Internet. The network 508 may comprise a private network, such as a content provider's distribution system. The decoder 510 may decode the encoded video frames. The decoder 510 may send the decoded video frames to a media player 512. The media player 512 may cause the decoded video frames to be output, such as to a user. A single client device may comprise the decoder 510 and the media player 512. A client device may comprise the decoder 510 and a device external to the client device may comprise the media player 512.

The encoder 506 may determine how to encode the video frames. The scene change detector 504 may augment the operations performed by the encoder 506 by determining a scene change. The scene change detector 504 may send an indication of the scene change to the encoder 506. For example, the scene change detector 504 may send an indication of a crossfade, a scene cut, or a flash frame to the encoder 506. The encoder 506 may determine how to encode the frames associated with the scene change based, at least, on the indication of the scene change. Determining how to encode the frames may comprise determining an encoded frame type for encoding the frames. For example, the encoder 506 may determine not to encode a frame as an inter-encoded frame based on an indication that the frame is the first of the frames that shows a new scene. Based on the indication of the scene change, the encoder 506 may not estimate the data size of the frame as encoded frame types. For example, the encoder 506 may not estimate the data size of the frame encoded as an inter-predicted frame.

The scene change detector 504 may comprise a low-complexity scene change detector. The scene change detector 504 may be configured to determine crossfade frames of a plurality of frames of a video. The scene change detector 504 may determine a numeric value for each frame describing a confidence value. The confidence value may comprise a probability or a degree of confidence that the frame shows a scene change or a crossfade or that the frame comprises a boundary frame of a crossfade. The scene change detector 504 may divide the frame into macroblocks and determine confidence values for each of the macroblocks. The scene change detector 504 may determine the confidence value based on histograms associated with the frames. The scene change detector 504 may determine the confidence value based on boundaries or edges of features shown in the frames.

The scene change detector 504 may determine that a confidence value meets or exceeds a threshold value. The threshold value may comprise a value that is known to be associated with a scene change. For example, the threshold value may be based on a value or a range of values determined for a known crossfade, flash frame, or scene cut. For example, histograms may be generated for frames known to comprise a crossfade, flash frame, or scene cut. Based on the generated histograms, bin values may be calculated. The threshold value may be determined based on the calculated bin values.

The scene change detector 504 may determine that the frame shows a scene change. For example, the scene change detector 504 may determine that the frame shows a scene change based on the confidence value meeting or exceeding the threshold value. Based on the confidence value meeting or exceeding the threshold value, the scene change detector 504 may determine that the frame shows a crossfade and/or comprises a boundary frame of a crossfade. Based on the confidence value meeting or exceeding the threshold value, the scene change detector 504 may determine that the frame shows a scene cut. Based on the confidence value meeting or exceeding the threshold value, the scene change detector 504 may determine that the frame shows a fade frame. Based on the confidence value meeting or being less than the threshold value, the scene change detector 504 may determine that the frame does not show a scene change, a crossfade, a boundary frame of a crossfade, a scene cut, and/or a fade frame.

The scene change detector 504 may send an indication of the scene change, the crossfade, the boundary frame of the crossfade, the scene cut, and/or the fade frame to the encoder 506. Based on the indication, the encoder 506 may not estimate the data size of the frame for encoded frame types. As an example, the encoder 506 may not estimate the data size of the frame encoded as an intra-coded frame.

The encoder 506 may encode the frame as an inter-predicted frame. The encoder 506 may encode the frame as an inter-predicted frame using High Efficiency Video Coding (HEVC). For example, the encoder 506 may encode the frame as an inter-predicted frame. The encoder 506 may encode the frame as an inter-predicted frame using High Efficiency Video Coding (HEVC) based on the indication of the scene change, the crossfade, the boundary frame of the crossfade, the scene cut, and/or the fade frame to the encoder 506. For example, if the frame is a boundary frame, the encoder 506 may encode frames following the boundary frame as P-frames referencing the boundary frame. The encoder may encode the boundary frame as an intra-coded frame. The encoder 506 may encode the frame as a bi-predicted frame (B-frame). The B-frame frame may be predicted from one of the frames within the next scene following the boundary frame. The B-frame may be directly predicted from the frame or may be predicted from other frames predicted from such the frame. The B-frame may be encoded as an Advanced Video Coding (AVC) or Random Access Decodable Leading (RADL) frame in the High-efficiency video coding standard (HEVC).

The scene change detector 504 and/or the encoder 506 may comprise a buffer for multiple (e.g., 0.25 sec-2.0 sec) frames. The scene change detector 504 and/or the encoder may determine, at one time, how to encode the multiple frames. The scene change detector 504 may send an indication of the determined encoding method of the multiple frames to the encoder 506.

The scene change detector 504 may determine a crossfade transition between two scenes. The scene change detector 504 may send an indication of the crossfade to the encoder 506. The scene change detector 504 may indicate a first boundary frame P(i). The scene change detector 504 may indicate a second boundary frame P(i+N) for crossfade frames comprising N frames. The scene change detector may indicate to the encoder 506 not to insert intra-coded frames between the first boundary frame P(i) and the second boundary frame P(i+N). The scene change detector may send the encoder 506 an indication not to estimate the data size of the crossfade frames as encoded frame types.

The scene change detector 504 may determine photographic flash or strobe effects ("flash frame"). A plurality of consecutive frames may comprise a flash ("flash zone") and frames immediately prior and immediately following the flash zone ("flash area"). The scene change detector may indicate, to the encoder 506, not to encode the flash zone frames as intra-coded frames. The scene change detector may indicate, to the encoder 506, not to use the flash zone frames as reference frames for inter-predicted frames outside the flash area.

The scene change detector 504 and/or the encoder 506 may determine illumination compensation weighting factors of each frame compared to one or more of a first boundary frame and a second boundary frame. The illumination compensation weighting factors may be associated with a difference in illumination between the boundary frames and a frame being coded. The illumination compensation weighting factors may be determined based on a sequence of the frames. For example, the illumination compensation weighting factors may comprise an average of the illumination value of reference frames, such as the first boundary frame, the second boundary frame, and/or another crossfade frame. The illumination compensation weighting factors may comprise an average of the illumination value of one or more macroblocks of the first boundary frame, the second boundary frame, and/or another crossfade frame. The illumination compensation weights may comprise an average of weighted illumination values of the frames, wherein the illumination values are weighted based on a sequence of the frames or a distance of an instant frame from the one or more reference frames. Illumination values of the frames being coded may be scaled by the illumination compensation weights. The scene change detector 504 may send an indication of the illumination compensation weighting factors to the encoder 506.

The scene change detector 504 may be configured to receive content comprising a plurality of frames. The plurality of frames may comprise a plurality of crossfade frames. The crossfade frames may show successive stages of a transition from a first scene to a second scene different from the first scene. The scene change detector 504 may be configured to determine that the plurality of frames comprise the crossfade frames. The scene change detector 504 may be configured to determine the crossfade frames by comparing histograms associated with macroblocks of successive frames. The histograms may represent intensity, chrominance, luminance, and/or luma (e.g., YUV) values and a number of pixels or macroblocks in the frame comprising the values. The histograms may comprise bins each associated with an intensity, chrominance, luminance, and/or luma value. The histogram may comprise a number of pixels having the value associated with each of the bins. For example, the bins may be indicated on a first axis of a histogram and the number of pixels associated with each of the bins may be indicted on a second axis of the histogram.

The scene change detector 504 may be configured to determine, based on the comparing the histograms, a series of frames that show a sharp and/or a gradual transition between scenes. For example, the bin values or the number of pixels associated with each of the bins of a histogram may be compared to the bin values or the number of pixels associated with each of the bins of another histogram. For example, a large difference between histograms associated with consecutive frames may indicate a scene change. Constant differences between histograms associated with a sequence of frames may indicate a crossfade. Comparing the histograms may comprise determining, using the histograms, a rate of change of the bin values or number of pixels corresponding to the bins over successive frames. A constant rate of change may be associated with a crossfade.

The scene change detector 504 may be configured to determine the crossfade frames by comparing boundaries or edges of features shown in the plurality of frames. The scene change detector 504 may be configured to determine crossfade frames based on determining that an illumination changes throughout the frames, but an edge of an object shown is persistent throughout the frames. The scene change detector 504 may be configured to distinguish a scene cut from a crossfade, such as based on a rate of change of the values or features among the frames.

The scene change detector 504 may be configured to determine a first boundary frame of the crossfade frames showing the first scene. The determining the first boundary frame may comprise comparing the first boundary frame and at least one frame of a plurality of frames preceding the first boundary frame in a sequence of the plurality of frames. The comparing the first boundary frame and the at least one frame preceding the first boundary frame may comprise comparing the histogram associated with the first boundary frame and at least one histogram associated with the at least one frame preceding the first boundary frame. The comparing the histograms may comprise determining a difference between the bin values or number of pixels corresponding to the bins. The scene change detector 504 may be configured to determine a boundary confidence value for the first boundary frame. The scene change detector 504 may be configured to determine that the boundary confidence value meets or exceeds a boundary confidence threshold value.

The scene change detector 504 may be configured to determine a second boundary frame of the plurality of crossfade frames showing the second scene. The determination of the second boundary frame may comprise comparing the second boundary frame and at least one frame of the plurality of frames preceding the second boundary frame in a sequence of the plurality of frames. The comparing the second boundary frame and the at least one frame preceding the second boundary frame may comprise comparing a histogram associated with the second boundary frame and at least one histogram associated with the at least one frame preceding the second boundary frame.

The scene change detector 504 may be configured to determine the crossfade frames. The determining the first boundary frame and the determining the second boundary frame may be based on the determining the crossfade frames. The determining the crossfade frames may comprise determining that the frames show the successive stages of the transition from the first scene to the second scene.

Alternatively or in addition, the scene change detector 504 may be configured to read a computer file, such as a text file. The computer file may indicate a scene change of a content asset. The computer file may indicate frames comprising the scene change. For example, the computer file may indicate a boundary frame of a crossfade. As another example, the computer file may indicate a flash frame. As another example, the computer file may indicate a scene cut. The computer file may be generated by a creator of a content asset. The computer file may be generated by a previous invocation of the detector. The computer file may be generated by post-production, playback, and/or color grading tools used to generate the video input 502. The computer file may be received by the scene change detector 504 with the content asset or separate from the content asset. The scene change detector 504 may send, to the encoder 506, an indication of the scene change. The scene change detector 504 may send, to the encoder 506, an indication of the frames comprising the scene change.

The encoder 506 may be configured to receive, from the scene change detector 504, an indication of the first boundary frame and the second boundary frame. The plurality of crossfade frames may comprise a sequence. The indication of the first boundary frame and the second boundary frame may comprise an indication to encode the each of the at least the portion of the plurality of transition frames based on the sequence. The indication of the first boundary frame and the second boundary frame may comprise an indication to encode at least the portion of the plurality of transition frames as inter-predicted frames referencing at least one of the first boundary frame or the second boundary frame. The plurality of transition frames may show successive stages of the transition from the first scene to the second scene. The indication of the first boundary frame and the second boundary frame may comprise an indication to not encode the each of the at least a portion of a plurality of transition frames as intra-coded frames ("I-frames"). The indication of the first boundary frame and the second boundary frame may comprise an indication to not estimate a data size of the transition frames as encoded frame types, such as a data size of the transition frames as intra-coded frames.

The encoder 506 may be configured to encode the first boundary frame and the second boundary frame as intra-coded frames (I-frames). For example, the encoder 506 may be configured to encode the first boundary frame and the second boundary frame as intra-coded frames (I-frames) based on the indication received from the scene change detector 504. Based on the indication received from the scene change detector 504, the encoder 506 may be configured to encode the transition frames as inter-predicted frames. Based on the indication received from the scene change detector 504, the encoder may be configured to not estimate the data size of one or more of the crossfade frames as encoded frame types.

The plurality of crossfade frames may comprise at least one flash frame. The scene change detector 504 and/or the encoder 506 may be configured to determine the at least one flash frame. The flash frame may comprise a frame with substantially uniform chrominance. The flash frame may comprise a frame with substantially uniform luminance. The flash frame may comprise one or more frames showing features with consistent edges as observed over the frames. The encoder 506 may be configured to encode the flash frame as an inter-predicted frame (P-frame or B-frame).

The encoder 506 may be configured to remove the flash frame from the plurality of crossfade frames. The encoder 506 may be configured to encode the at least one flash frame as a frame type that is different from a reference frame type. The encoder 506 may be configured to encode each of at least another portion of the plurality of transition frames as inter-predicted frames referencing at least one encoded frame of the plurality of crossfade frames.

The encoder 506 may be configured to send, to the decoder 510, the encoded first boundary frame, second boundary frame, and transition frames. The encoder 506 may be configured to stream, to the decoder 510, the encoded first boundary frame, second boundary frame, and transition frames. The encoder 506 may be configured to send, to the decoder 510, decoding information associated with the encoded first boundary frame, second boundary frame, and transition frames.

The scene change detector 504 and/or the encoder 506 may be configured to determine a prediction error value for one or more encoded frames of the plurality of transition frames based on a sequence of the plurality of crossfade frames. The encoder 506 may be configured to send, to the decoder 510, an indication of the prediction error value. The encoder 506 may be configured to determine a prediction error value for one or more frames of the plurality of transition frames encoded as inter-predicted frames referencing at least one of the first boundary frame or the second boundary frame. The encoder 506 may be configured to raw encode the one or more frames based on the prediction error value.

The scene change detector 504 and/or the encoder 506 may be configured to store a portion of the plurality of frames in a buffer memory. The scene change detector 504 and/or the encoder 506 may be configured to determine that the portion of the plurality of frames comprises the first boundary frame. The portion of the plurality of frames may comprise a predetermined number of frames of the plurality of frames. The predetermined number may be based on the buffer memory. The predetermined number may comprise a number of frames associated with a predetermined time of the video content.

Figure 6:
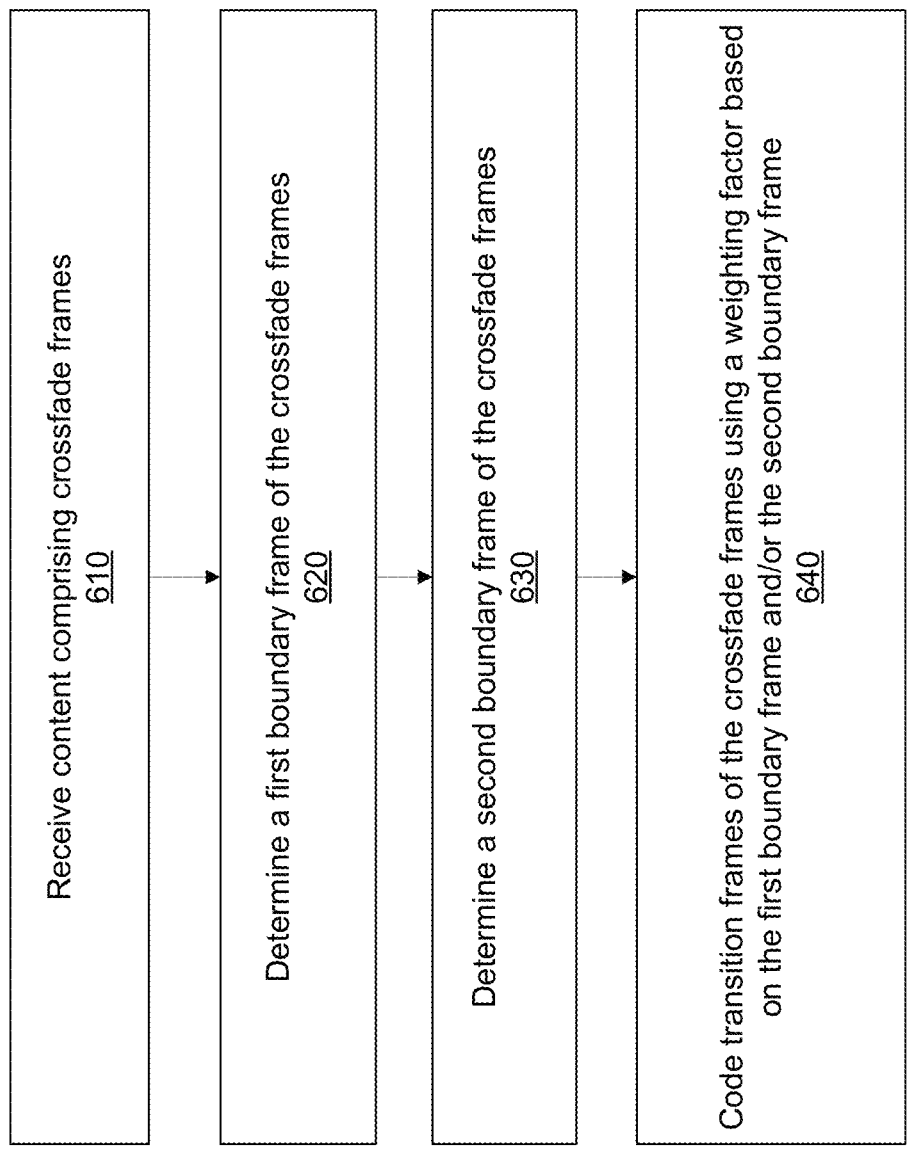
FIG. 6 shows an example method.

FIG. 6 shows an example method. At step 610, video content comprising a plurality of frames may be received. The scene change detector 504 in FIG. 5 may receive the video content comprising a plurality of frames. The encoder 506 in FIG. 5 may receive the video content comprising a plurality of frames. The plurality of frames may comprise a plurality of crossfade frames.

At step 620, a first boundary frame of the plurality of crossfade frames showing a first scene may be determined. The scene change detector 504 in FIG. 5 may determine the first boundary frame of the plurality of crossfade frames showing a first scene. The determining the first boundary frame may comprise comparing the first boundary frame and at least one frame of a plurality of frames preceding the first boundary frame in a sequence of the plurality of frames.

The comparing the first boundary frame and the at least one frame preceding the first boundary frame may comprise comparing a histogram associated with the first boundary frame and at least one histogram associated with the at least one frame preceding the first boundary frame. The comparing the first boundary frame and the at least one frame preceding the first boundary frame may comprise comparing bin values of histogram associated with the first boundary frame and bin values of a histogram associated with the at least one frame preceding the first boundary frame. Bins of a histogram may correspond to color space components (e.g., intensity, chrominance (chroma), luminance, or luma) of a frame. Bin values of a histogram may correspond to a number of pixels of the frame associated with each of the bins.

A boundary confidence value for the first boundary frame may be determined. The scene change detector 504 in FIG. 5 may determine the boundary confidence value for the first boundary frame. The boundary confidence value may be determined based on comparing the histograms. The boundary confidence value may be determined based on the bin values of the histograms. The bin values associated with each of the bins of a histogram may be compared to the bin values or the number of pixels associated with each of the bins of another histogram.

A determination may be made that the boundary confidence value meets or exceeds the boundary confidence threshold value. If the difference in bin values between one or more frames meets or exceeds a threshold value, the one or more frames may be determined to comprise a scene change of a crossfade. The threshold value may comprise a value that is known to be associated with a crossfade. For example, the threshold value may be based on a value or a range of values determined for a known crossfade. For example, histograms may be generated for frames known to comprise a crossfade. Based on the generated histograms, bin values may be calculated. The threshold value may be determined based on the calculated bin values. The scene change detector 504 in FIG. 5 may determine that the boundary confidence value meets or exceeds a boundary confidence threshold value.

A portion of the plurality of frames may be stored in a buffer memory. The scene change detector 504 in FIG. 5 may store a portion of the plurality of frames in a buffer memory. A determination may be made that the portion of the plurality of frames comprises the first boundary frame. The scene change detector 504 in FIG. 5 may determine that the portion of the plurality of frames comprises the first boundary frame. The portion of the plurality of frames may comprise a predetermined number of frames of the plurality of frames. The predetermined number may be based on the buffer memory. The predetermined number may comprise a number of frames associated with a predetermined time of the video content.

At step 630, a second boundary frame of the plurality of crossfade frames showing a second scene different from the first scene may be determined. The scene change detector 504 in FIG. 5 may determine a second boundary frame of the plurality of crossfade frames showing a second scene different from the first scene. The determining the second boundary frame may comprise comparing the second boundary frame and at least one frame of the plurality of frames preceding the second boundary frame in a sequence of the plurality of frames. The comparing the second boundary frame and the at least one frame preceding the second boundary frame may comprise comparing a histogram associated with the second boundary frame and at least one histogram associated with the at least one frame preceding the second boundary frame, as described in step 620. The comparing the second boundary frame and the at least one frame preceding the second boundary frame may comprise comparing bin values of a histogram associated with the second boundary frame and bin values of a histogram associated with the at least one frame preceding the second boundary frame, as described in step 620.

The first boundary frame and the second boundary frame may be coded as intra-coded frames (I-frames). The encoder 506 in FIG. 5 may encode the first boundary frame and the second boundary frame as intra-coded frames. The first boundary frame and the second boundary frame may be coded as inter-predicted frames (B-frames or P-frames).

A data size of the first boundary frame and/or the second boundary frame as different encoded frame types may not be estimated. For example, the data size of the first boundary frame and/or the second boundary frame as different encoded frame types may not be estimated based on the determined first boundary frame and the second boundary frame. Based on the determined first boundary frame and the second boundary frame, a data size of one or more frames after the first boundary frame and/or between the first boundary frame and the second boundary frame as different encoded frame types may not be estimated.

At step 640, each of at least a portion of a plurality of transition frames of the plurality of crossfade frames may be coded as inter-predicted frames, such as B-frames or P-frames. The transition frames may be coded as inter-predicted frames based on the determination of the boundary frames and/or the transition frames comprising crossfade frames. The inter-predicted frames may reference at least one of the first boundary frame or the second boundary frame. The encoder 506 in FIG. 5 may encode each of at least a portion of a plurality of transition frames of the plurality of crossfade frames inter-predicted frames referencing at least one of the first boundary frame or the second boundary frame.

The coding the each of the at least the portion of the plurality of transition frames as inter-predicted frames may comprise determining one or more weighted motion vectors for each of the transition frames. The weighted motion vector may comprise a motion vector scaled by a weighting factor. The weighted motion vector and/or the weighting factor may be determined based on the determination of the of the boundary frames and/or the transition frames comprising crossfade frames. The weighted motion vector and/or the weighting factor may be determined based on a sequence of the at least the portion of the plurality of transition frames. The encoder 506 in FIG. 5 may determine the weighted values.

The weighting factors may be determined using a weighted prediction algorithm. The weighted prediction algorithm may be based on a sequence of the crossfade frames. Transition frames that are earlier in the sequence may be determined to be more similar to the first boundary frame. For example, P(i) may be the first boundary frame and P(i+N) may be the second boundary frame, where there are N transition frames. A frame P(i+1) may show a first stage in the transition from the first scene to the second scene. A frame P(i+N−1) may show the last stage in the transition from the first scene to the second scene. The frame P(i+1) may comprise more data from the first scene than the second scene. The frame P(i+1) may comprise 95% data from the first scene and 5% data from the second scene. The frame P(i+N−1) may comprise more data from the second scene than the first scene. The frame P(i+N−1) may comprise 95% data from the second scene and 5% data from the first scene.

The weighted motion vectors may reference the first boundary frame, the second boundary frame, and/or another frame of the content asset and/or the crossfade frames. A motion vector may comprise an indication of a location of a block of pixels in the reference frame and a location of a block pixels in the frame to be encoded. A motion vector referencing the first boundary frame may be scaled by the weighting factor determined for the first boundary frame. A motion vector referencing the second boundary frame may be scaled by the weighting factor determined for the second boundary frame. A motion vector for a macroblock of the frame being encoded may comprise a sum or average of the weighted motion vector referencing the first boundary frame and the weighted motion vector referencing the second boundary frame.

Each of at least another portion of the plurality of transition frames may be coded as inter-predicted frames referencing at least one encoded frame of the plurality of crossfade frames. The encoder 506 in FIG. 5 may encode each of at least another portion of the plurality of transition frames as inter-predicted frames referencing at least one encoded frame of the plurality of crossfade frames.

A prediction error value may be determined for one or more encoded frames of the plurality of transition frames based on a sequence of the plurality of crossfade frames. The encoder 506 in FIG. 5 may determine a prediction error value for one or more encoded frames of the plurality of transition frames based on a sequence of the plurality of crossfade frames. An indication of the prediction error value may be sent to a decoder. The encoder 506 in FIG. 5 may send an indication of the prediction error value to the decoder 510 in FIG. 5. A prediction error value may be determined for one or more frames of the plurality of transition frames encoded as inter-predicted frames referencing at least one of the first boundary frame or the second boundary frame. The encoder 506 in FIG. 5 may determine a prediction error value for one or more frames of the plurality of transition frames encoded as inter-predicted frames referencing at least one of the first boundary frame or the second boundary frame. The one or more frames may be raw encoded based on the prediction error value. The encoder 506 in FIG. 5 may raw code the one or more frames based on the prediction error value.

An illumination compensation weighting factor may be determined for at least one of the plurality of transition frames based at least on a sequence of the plurality of crossfade frames. The encoder 506 in FIG. 5 may determine an illumination compensation weighting factor for at least one of the plurality of transition frames based at least on a sequence of the plurality of crossfade frames. For example, the illumination compensation weighting factor may comprise an average of the illumination value of reference frames, such as the first boundary frame, the second boundary frame, and/or another crossfade frame. The illumination compensation weighting factors may comprise an average of the illumination value of one or more macroblocks of the first boundary frame, the second boundary frame, and/or another crossfade frame. The illumination compensation weighting factor may comprise an average of weighted illumination values of the frames, wherein the illumination values are weighted based on a sequence of the frames or a distance of an instant frame from the one or more reference frames. An indication of the illumination compensation weighting factor may be sent to a decoder. The encoder 506 in FIG. 5 may send an indication of the illumination compensation weighting factor to the decoder 510 in FIG. 5.

An encoded first boundary frame, second boundary frame, and transition frames may be sent to a decoder. The encoder 506 in FIG. 5 may send the encoded first boundary frame, second boundary frame, and transition frames to the decoder 510 in FIG. 5. The sending, to the decoder, encoded first boundary frame, second boundary frame, and transition frames may comprise streaming, to the decoder, the encoded first boundary frame, second boundary frame, and transition frames. Decoding information associated with the encoded first boundary frame, second boundary frame, and transition frames may be sent to the decoder. The encoder 506 in FIG. 5 may send decoding information associated with the encoded first boundary frame, second boundary frame, and transition frames to the decoder 510 in FIG. 5.

For example, a user device may request a video asset. The video asset may comprise a crossfade. Raw video associated with the requested video asset may be sent to a scene change detector. The scene change detector may determine a first boundary frame associated with the crossfade. The scene change detector may send an indication of the first boundary frame to an encoder. The scene change detector may determine a plurality of crossfade transition frames associated with the crossfade. The scene change detector may send an indication of the crossfade transition frames to the encoder. The scene change detector may determine a second boundary frame associated with the crossfade. The scene change detector may send an indication of the second boundary frame to an encoder. The encoder may determine to use the first boundary frame and/or the second boundary frame as reference frames for encoding the transition frames as inter-predicted frames. The encoder may send the encoded frames associated with the crossfade to a decoder associated with the user device.

A method similar to the method of FIG. 6 may be performed for a plurality of frames comprising a flash frame and/or scene cut frames. As an example, for a flash frame, in steps 620-630 the flash frame may be determined. The flash frame may be determined by comparing boundaries or edges of features shown in the frames. A flash frame may comprise a one or more frames having a change in illumination throughout a sequence of frames. The feature or an edge associated with the feature may remain consistent throughout the frames of the flash frame. The flash frame may comprise one or more frames that show the same feature shown in a previous frame, but have a different illumination than the previous frame. The detector may determine the flash frame based on an edge remaining consistent throughout the frames. The detector may determine the flash frame by comparing histograms associated with the frames and/or bin values of the histograms. The detector may determine a confidence value associated with a frame comprising flash frame. Based on the confidence value meeting or exceeding a threshold confidence value, the frame may be determined to comprise a flash frame.

For the flash frame, at step 640, an indication of the flash frame may be sent to an encoder. Based on the indication, the encoder may not estimate a data size of the flash frame as encoded frame types. Based on the indication, the encoder may remove the flash frame. Based on the indication, the encoder may encode the flash frame as an inter-predicted frame type. Based on the indication, the encoder may determine a prediction weighting factor for the flash frame and use the weighting factor to encode the flash frame.

For a scene cut, in steps 620-630, the scene cut frames may be determined. A scene cut may comprise a sharp transition from a first scene to a second scene. For example, a scene cut may comprise a first frame showing a first scene and a second frame immediately preceding the first frame showing a second scene. The detector may distinguish a scene cut from a crossfade or a flash frame, such as based on a rate of change of histogram bin values and/or based on edges of the frames. Based on the indication, the encoder may predict a frame proceeding the flash frame. The frame proceeding the flash frame may show a feature after the flash event.

For the scene cut, at step 640, an indication of the scene cut frames may be sent to an encoder. Based on the indication, the encoder may not estimate a data size of the scene cut frames as encoded frame types. Based on the indication, the encoder may remove the scene cut frames. Based on the indication, the encoder may encode the scene cut frames as an inter-predicted frame type. Based on the indication, the encoder may determine a prediction weighting factor for the scene cut frames and use the weighting factor to encode the scene cut frames.

Figure 7:
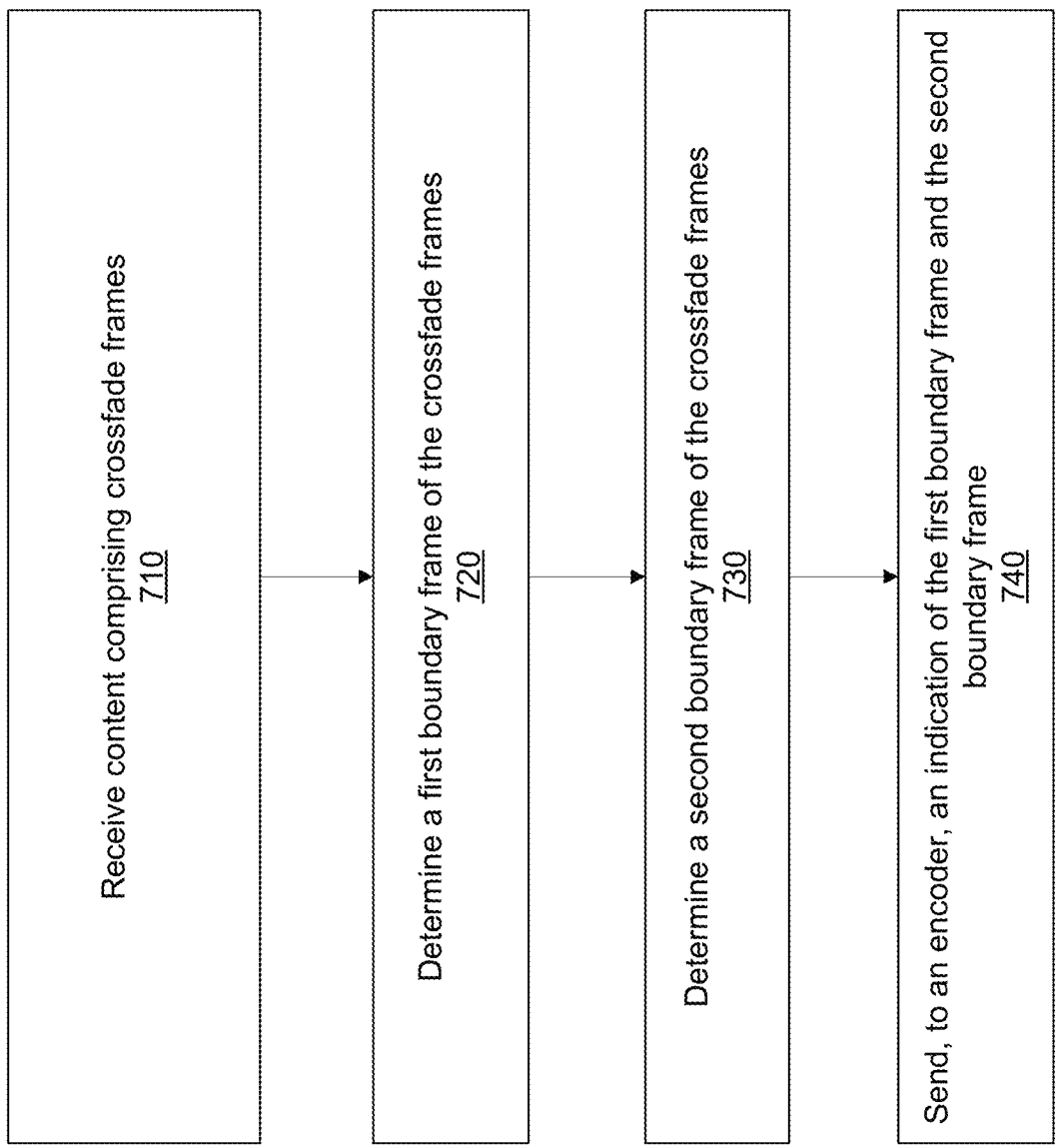
FIG. 7 shows an example method.

FIG. 7 shows an example method. At step 710, content comprising a plurality of frames may be received. The content may be received by a scene change detector, such as scene change detector 503 in FIG. 5. The plurality of frames may comprise a plurality of crossfade frames showing successive stages of a transition from a first scene to a second scene different from the first scene.

At step 720, a first boundary frame of the plurality of crossfade frames showing the first scene may be determined. The scene change detector 504 in FIG. 5 may determine a first boundary frame of the plurality of crossfade frames showing the first scene. The determining the first boundary frame may comprise comparing the first boundary frame and at least one frame of a plurality of frames preceding the first boundary frame in a sequence of the plurality of frames. The comparing the first boundary frame and the at least one frame preceding the first boundary frame may comprise comparing a histogram associated with the first boundary frame and at least one histogram associated with the at least one frame preceding the first boundary frame.

A boundary confidence value may be determined for the first boundary frame. The scene change detector 504 in FIG. 5 may determine a boundary confidence value for the first boundary frame. The boundary confidence value may be determined based on the comparing the histograms. Bins of a histogram may correspond to color space components (e.g., intensity, chrominance (chroma), luminance, or luma) of a frame. Bin values of a histogram may correspond to a number of pixels of the frame associated with each of the bins. The bin values associated with each of the bins of a histogram may be compared to the bin values or the number of pixels associated with each of the bins of another histogram. If the difference in bin values between one or more frames meets or exceeds a threshold value, the one or more frames may be determined to comprise a scene change of a crossfade. The threshold value may comprise a value that is known to be associated with a scene change. For example, the threshold value may be based on a value or a range of values determined for a known crossfade. For example, histograms may be generated for frames known to comprise a crossfade, flash frame, or scene cut. Based on the generated histograms, bin values may be calculated. The threshold value may be determined based on the calculated bin values. The scene change detector 504 in FIG. 5 may determine that the boundary confidence value meets or exceeds a boundary confidence threshold value.

A portion of the plurality of frames may be stored in a buffer memory. The scene change detector 504 in FIG. 5 may store a portion of the plurality of frames in a buffer memory. A determination may be made that the portion of the plurality of frames comprises the first boundary frame. The scene change detector 504 in FIG. 5 may determine that the portion of the plurality of frames comprises the first boundary frame. The portion of the plurality of frames may comprise a predetermined number of frames of the plurality of frames. The predetermined number may be based on the buffer memory. The predetermined number may comprise a number of frames associated with a predetermined time of the video content.

At step 730, a second boundary frame of the plurality of crossfade frames showing the second scene may be determined. The scene change detector 504 in FIG. 5 may determine a second boundary frame of the plurality of crossfade frames showing the second scene. The determining the second boundary frame may comprise comparing the second boundary frame and at least one frame of the plurality of frames preceding the second boundary frame in a sequence of the plurality of frames. The comparing the second boundary frame and the at least one frame preceding the second boundary frame may comprise comparing a histogram associated with the second boundary frame and at least one histogram associated with the at least one frame preceding the second boundary frame. The comparing the histograms may comprise comparing bin values of the histograms, as in step 720.

The plurality of crossfade frames may be determined. The scene change detector 504 in FIG. 5 may determine the plurality of crossfade frames. The determining the first boundary frame and the determining the second boundary frame may be based on the plurality of crossfade frames. The determining the plurality of crossfade frames may comprise determining that the frames show the successive stages of the transition from the first scene to the second scene.

At step 740, an indication of the first boundary frame and the second boundary frame may be sent to an encoder. The scene change detector 504 in FIG. 5 may send an indication of the first boundary frame and the second boundary frame to the encoder 506 in FIG. 5. Based on the indication of the first boundary frame and the second boundary frame, the encoder may determine to code transition frames of the crossfade as inter-predicted frames referencing the first boundary frame and/or the second boundary frame. Based on the indication of the first boundary frame and the second boundary frame, the encoder may not estimate a data size of the first boundary frame and/or the second boundary frame as encoded frame types. Based on the indication of the first boundary frame and the second boundary frame, the encoder may not estimate a data size of the a frame after first boundary frame and/or a frame between the first boundary frame and the second boundary frame as encoded frame types.

An indication that the plurality of frames comprise crossfade frames may be sent to the encoder. Based on the indication that the plurality of frames comprise crossfade frames, the encoder may not estimate a data size of one or more of the crossfade frames as encoded frame types.

A method similar to the method of FIG. 7 may be performed for a plurality of frames comprising a flash frame and/or scene cut frames. As an example, for a flash frame, in steps 720-730 the flash frame may be determined. The flash frame may be determined by comparing boundaries or edges of features shown in the frames. A flash frame may comprise a one or more frames having a change in illumination throughout a sequence of frames. The feature or an edge associated with the feature may remain consistent throughout the frames of the flash frame. The flash frame may comprise one or more frames that show the same feature shown in a previous frame, but have a different illumination than the previous frame. The detector may determine the flash frame based on an edge remaining consistent throughout the frames. The detector may determine the flash frame by comparing histograms associated with the frames and/or bin values of the histograms. The detector may determine a confidence value associated with a frame comprising flash frame. Based on the confidence value meeting or exceeding a threshold confidence value, the frame may be determined to comprise a flash frame.

For the flash frame, at step 740, an indication of the flash frame may be sent to an encoder. Based on the indication, the encoder may not estimate a data size of the flash frame as encoded frame types. Based on the indication, the encoder may remove the flash frame. Based on the indication, the encoder may encode the flash frame as an inter-predicted frame type. Based on the indication, the encoder may determine a prediction weighting factor for the flash frame and use the weighting factor to encode the flash frame. Based on the indication, the encoder may predict a frame proceeding the flash frame. The frame proceeding the flash frame may show a feature after the flash event.

For a scene cut, in steps 720-730, the scene cut frames may be determined. A scene cut may comprise a sharp transition from a first scene to a second scene. For example, a scene cut may comprise a first frame showing a first scene and a second frame immediately preceding the first frame showing a second scene. The detector may distinguish a scene cut from a crossfade or a flash frame, such as based on a rate of change of histogram bin values and/or based on edges of the frames.

For the scene cut, at step 740, an indication of the scene cut frames may be sent to an encoder. Based on the indication, the encoder may not estimate a data size of the scene cut frames as encoded frame types. Based on the indication, the encoder may remove the scene cut frames. Based on the indication, the encoder may encode the scene cut frames as an inter-predicted frame type. Based on the indication, the encoder may determine a prediction weighting factor for the scene cut frames and use the weighting factor to encode the scene cut frames.

Figure 8:
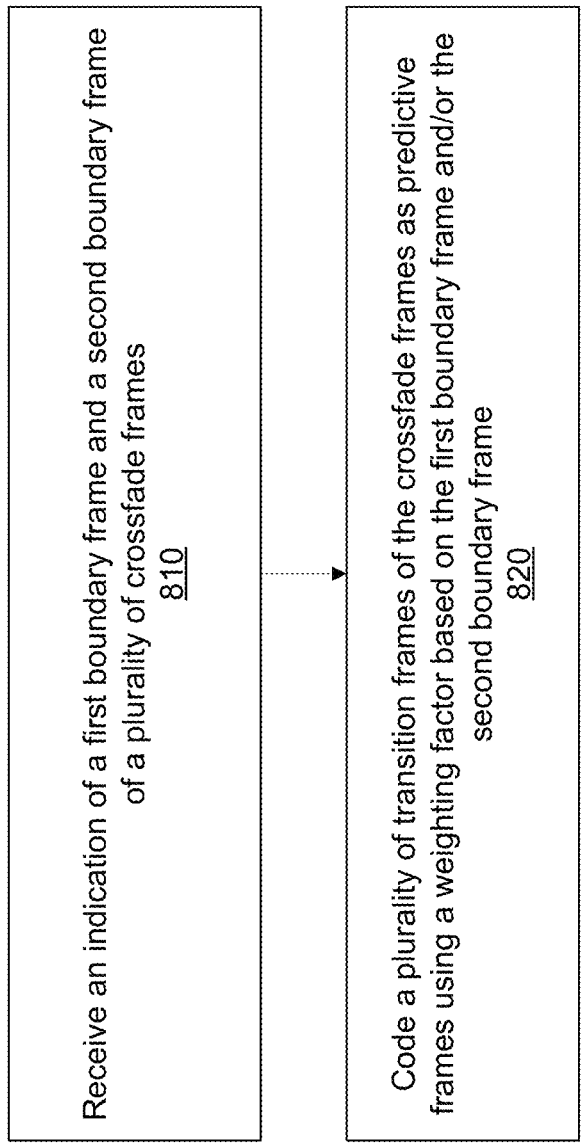
FIG. 8 shows an example method.

FIG. 8 shows an example method. At step 810, an indication of a first boundary frame and a second boundary frame of a plurality of crossfade frames may be received by an encoder. The encoder 506 in FIG. 5 may receive an indication of a first boundary frame and a second boundary frame of a plurality of crossfade frames from the scene change detector 504. An indication frames comprise the plurality of crossfade frames may be received by the encoder. The plurality of crossfade frames may show a transition from a first scene in the first boundary frame to a second scene different from the first scene in the second boundary frame. Based on the indication, the first boundary frame and/or the second boundary frame may be encoded as intra-coded frames (I-frames).

A data size for one or more of the plurality of crossfade frames as encoded frame types may not be estimated. For example, the data size for one or more of the plurality of crossfade frames as encoded frame types may not be estimated based on the received indication of the first boundary frame and the second boundary frame. The encoder may be configured to calculate data sizes of one or more frames as encoded frame types and encode the frames using the type with the smallest data size. Based on the frames comprising crossfade frames, the encoder may bypass this process and may not estimate the data size of the frames as encoded frame types.

The first boundary frame and/or the second boundary frame may be encoded as intra-predicted frames, such as B-frames and/or P-frames. For example, first boundary frame and/or the second boundary frame may be encoded as intra-predicted frames, such as B-frames and/or P-frames based on the received indication of the first boundary frame and the second boundary frame. The first boundary frame and/or the second boundary frame may be encoded as a type of frame that is configured to be referenced by an inter-predicted frame.

At step 820, each of at least a portion of a plurality of transition frames of the plurality of crossfade frames may be coded as inter-predicted frames referencing at least one of the first boundary frame and/or the second boundary frame. The transition frames may be coded as inter-predicted frames based on the indication of the first boundary frame and the second boundary frame. The encoder 506 in FIG. 5 may encode each of at least a portion of a plurality of transition frames of the plurality of crossfade frames as inter-predicted frames referencing at least one of the first boundary frame or the second boundary frame. The coding the each of the at least the portion of the plurality of transition frames as inter-predicted frames may comprise coding each of the at least the portion of the plurality of transition frames based at least on a sequence of the at least the portion of the plurality of transition frames.

The coding the transition frames may comprise determining weights associated with the transition frames. The weights may be based on a sequence of the crossfade frames. For example, the weights may be determined based on a number of frames between an instant frame being coded and the first boundary frame and/or the second boundary frame. The weights may be determined based on a number of frames in the plurality of crossfade frames.

The weights may be used to encode frames as inter-predicted frames. For example, the weights may be used to determine motion vectors for a frame that reference one or more other frames. A motion vector may comprise an indication of a location of a block of pixels in the reference frame and a location of a block pixels in the frame to be encoded. A motion vector referencing the first boundary frame may be weighted by the weighting factor determined for the first boundary frame. A motion vector referencing the second boundary frame may be weighted by the weighting factor determined for the second boundary frame. A motion vector for a macroblock of the frame being encoded may comprise a sum or average of the weighted motion vector referencing the first boundary frame and the weighted motion vector referencing the second boundary frame.

The coding the each of the at least the portion of the plurality of transition frames as inter-predicted frames may comprise coding the each of the at least the portion of the plurality of transition frames as bi-directional inter-predicted frames ("B-frames"). The coding the each of the at least the portion of the plurality of transition frames as inter-predicted frames may comprise coding the each of the at least the portion of the plurality of transition frames as predicted frames ("P-frames"). Each of at least another portion of the plurality of transition frames may be coded as inter-predicted frames referencing at least one encoded frame of the plurality of crossfade frames. The encoder 506 in FIG. 5 may encode each of at least another portion of the plurality of transition frames as inter-predicted frames referencing at least one encoded frame of the plurality of crossfade frames.

A prediction error value may be determined for one or more encoded frames of the plurality of transition frames based on a sequence of the plurality of crossfade frames. The encoder 506 in FIG. 5 may determine a prediction error value for one or more encoded frames of the plurality of transition frames based on a sequence of the plurality of crossfade frames. An indication of the prediction error value may be sent to a decoder. The encoder 506 in FIG. 5 may send an indication of the prediction error value to the decoder 510 in FIG. 5.

A prediction error value may be determined for one or more frames of the plurality of transition frames encoded as inter-predicted frames referencing at least one of the first boundary frame or the second boundary frame. The encoder 506 in FIG. 5 may determine a prediction error value for one or more frames of the plurality of transition frames encoded as inter-predicted frames referencing at least one of the first boundary frame or the second boundary frame. The one or more frames may be raw encoded based on the prediction error value. The encoder 506 in FIG. 5 may raw encode the one or more frames based on the prediction error value.

The encoded first boundary frame, second boundary frame, and transition frames may be sent to a decoder. The encoder 506 in FIG. 5 may send the encoded first boundary frame, second boundary frame, and transition frames to the decoder 510 in FIG. 5. The sending, to the decoder, the encoded first boundary frame, second boundary frame, and transition frames may comprise streaming, to the decoder, the encoded first boundary frame, second boundary frame, and transition frames. Decoding information associated with the encoded first boundary frame, second boundary frame, and transition frames may be sent to the decoder. The encoder 506 in FIG. 5 may send decoding information associated with the encoded first boundary frame, second boundary frame, and transition frames to the decoder 510 in FIG. 5.

A method similar to the method of FIG. 8 may be performed for a plurality of frames comprising a flash frame and/or scene cut frames. As an example, for a flash frame, in step 810 an indication of the flash frame may be received. At step 820, the flash frame may be coded using a weighted prediction algorithm based on the frame comprising a flash frame. Based on the indication, a data size of the flash frame as encoded data types may not be estimated. Based on the indication, the flash frame may be removed from the frames of the content.

For a scene cut, at step 810, an indication of the scene cut frames may be received. At step 820, the scene cut frames may be coded using a weighted prediction algorithm based on the frame comprising a flash frame. Based on the indication, a data size of the scene cut frames as encoded data types may not be estimated. Based on the indication, one or more of the scene cut frames may be removed from the frames of the content.

Figure 9:
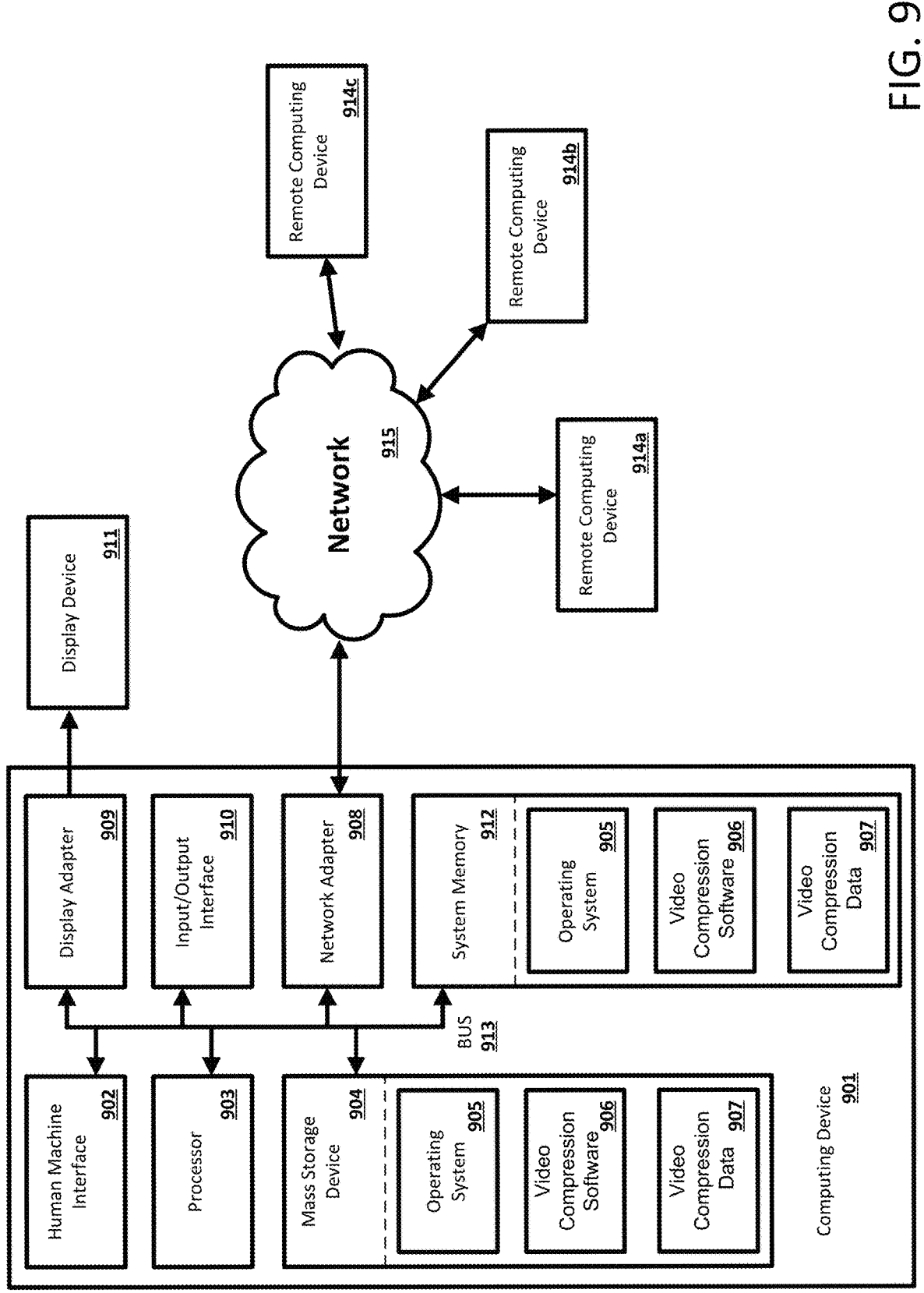
FIG. 9 shows an example computing environment.

FIG. 9 shows an example computing environment. This operating environment is not intended to suggest any limitation as to the scope of use or functionality of operating environment architecture. Neither should the operating environment be interpreted as having any dependency or requirement relating to any one or combination of components shown in the operating environment.

The systems, methods, and apparatuses described herein may be operational with numerous other general purpose or special purpose computing system environments or configurations. Computing systems, environments, and/or configurations that may be suitable for use with the systems, methods, and apparatuses comprise, but are not limited to, personal computers, server computers, laptop devices, and multiprocessor systems. Set top boxes, programmable consumer electronics, network PCs, minicomputers, mainframe computers, distributed computing environments that comprise any of the above systems or devices, and the like may be used to implement the methods, systems, and apparatuses.

The systems, methods, and apparatuses may be implemented, in whole or in part, by software components. The disclosed methods, systems, and apparatuses may be described in the general context of computer-executable instructions, such as program modules, being executed by one or more computers or other devices. Generally, program modules comprise computer encode, routines, programs, objects, components, data structures, etc. that perform particular tasks or implement particular abstract data types. The methods, systems, and apparatuses may be practiced in grid-based and distributed computing environments where tasks are performed by remote processing devices that are linked through a communications network. In a distributed computing environment, program modules may be located in both local and remote computer storage media including memory storage devices.

The methods, systems, and apparatuses may be implemented via a general-purpose computing device in the form of a computing device 901. The components of the computing device 901 may comprise, but are not limited to, one or more processors 903, a system memory 912, and a system bus 913 that couples various system components including the processor 903 to the system memory 912. With multiple processors 903, the system may utilize parallel computing.

The system bus 913 represents one or more of several possible types of bus structures, including a memory bus or memory controller, a peripheral bus, an accelerated graphics port, and a processor or local bus using any of a variety of bus architectures. Such architectures may comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 913, and all buses specified in this description may be implemented over a wired or wireless network connection and each of the subsystems, including the processor 903, a mass storage device 904, an operating system 905, a video compression software 906, a video compression data 907, a network adapter 908, system memory 912, an Input/Output Interface 910, a display adapter 909, a display device 911, and a human machine interface 902, may be contained within one or more remote computing devices 914a,b,c at physically separate locations, connected through buses of this form, in effect implementing a fully distributed system.

The computing device 901 typically comprises a variety of computer readable media. Readable media may be any available media that is accessible by the computing device 901 and comprises both volatile and non-volatile media, removable and non-removable media. The system memory 912 comprises computer readable media in the form of volatile memory, such as random access memory (RAM), and/or non-volatile memory, such as read only memory (ROM). The system memory 912 typically contains data such as video compression data 907 and/or program modules such as operating system 905 and video compression software 906 that are immediately accessible to and/or are presently operated on by the processor 903.

The computing device 901 may comprise other removable/non-removable, volatile/non-volatile computer storage media. FIG. 9 shows a mass storage device 904 which may provide non-volatile storage of computer encode, computer readable instructions, data structures, program modules, and other data for the computing device 901. A mass storage device 904 may be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules may be stored on the mass storage device 904, including an operating system 905 and video compression software 906. Each of the operating system 905 and video compression software 906 (or some combination thereof) may comprise elements of the programming and the video compression software 906. Video compression data 907 may be stored on the mass storage device 904. Video compression data 907 may be stored in any of one or more databases known in the art. Such databases may comprise, DB2®, Microsoft® Access, Microsoft® SQL Server, Oracle®, mySQL, PostgreSQL, and the like. The databases may be centralized or distributed across multiple systems.

The user may enter commands and information into the computing device 901 via an input device (not shown). Input devices may comprise, but are not limited to, a keyboard, pointing device (e.g., a "mouse"), a microphone, and a joystick, tactile input devices such as gloves, and other body coverings, and the like. These and other input devices may be connected to the processor 903 via a human machine interface 902 that is coupled to the system bus 913, but may be connected by other interface and bus structures, such as a parallel port, game port, an IEEE 1394 Port (also known as a Firewire port), a serial port, or a universal serial bus (USB).

A display device 911 may be connected to the system bus 913 via an interface, such as a display adapter 909. It is contemplated that the computing device 901 may have more than one display adapter 909 and the computing device 901 may have more than one display device 911. A display device may be a monitor, an LCD (Liquid Crystal Display), or a projector. Output peripheral devices may comprise components such as speakers (not shown) and a printer (not shown) which may be connected to the computing device 901 via Input/Output Interface 910. Any step and/or result of the methods may be output in any form to an output device. Such output may be any form of visual representation, including, but not limited to, textual, graphical, animation, audio, tactile, and the like. The display 911 and computing device 901 may be part of one device, or separate devices.

The computing device 901 may operate in a networked environment using logical connections to one or more remote computing devices 914a,b,c. A remote computing device may be a personal computer, portable computer, smartphone, a server, a router, a network computer, a peer device, or other common network node, and so on. Logical connections between the computing device 901 and a remote computing device 914a,b,c may be made via a network 915, such as a local area network (LAN) and a general wide area network (WAN). Such network connections may be through a network adapter 908. A network adapter 908 may be implemented in both wired and wireless environments. Such networking environments are conventional and commonplace in dwellings, offices, enterprise-wide computer networks, intranets, and the Internet.

Application programs and other executable program components such as the operating system 905 are shown herein as discrete blocks, although it is recognized that such programs and components reside at various times in different storage components of the computing device 901, and are executed by the data processor(s) of the computer. An implementation of video compression software 906 may be stored on or sent across some form of computer readable media. Any of the disclosed methods may be performed by computer readable instructions embodied on computer readable media. Computer readable media may be any available media that may be accessed by a computer. Computer readable media may comprise "computer storage media" and "communications media." "Computer storage media" comprise volatile and non-volatile, removable and non-removable media implemented in any methods or technology for storage of information such as computer readable instructions, data structures, program modules, or other data. Computer storage media may comprise, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by a computer.

What is claimed is:
1. A method comprising:
   determining a plurality of crossfade frames, of a content asset, associated with a transition from a first scene to a second scene, wherein the plurality of crossfade frames comprises a first boundary frame associated with the first scene, a second boundary frame associated with the second scene, and a plurality of transition frames;
   determining, for a transition frame of the plurality of transition frames and based on a proximity of the transition frame to the first boundary frame, a first weighting factor;

determining, for the transition frame and based on a proximity of the transition frame to the second boundary frame, a second weighting factor;

determining, for the transition frame and based on the first weighting factor, a first motion vector associated with the first boundary frame;

determining, for the transition frame and based on the second weighting factor, a second motion vector associated with the second boundary frame; and encoding, based on the first motion vector and the second motion vector, the transition frame as an inter-predicted frame.

2. The method of claim 1, wherein the method further comprises determining, not to encode at least one frame of the plurality of transition frames as an intra-coded frame (I-frame).

3. The method of claim 1, wherein the determining the plurality of crossfade frames comprises comparing data associated with at least one of intensity, chroma, luminance, or luma of pixels of the first boundary frame and data associated with the at least one of intensity, chroma, luminance, or luma of pixels of at least another frame of the plurality of frames.

4. The method of claim 1, wherein the determining the plurality of crossfade frames comprises:
   determining a boundary confidence value for the first boundary frame; and
   determining that the boundary confidence value at least one of meets or exceeds a boundary confidence threshold value.

5. The method of claim 1, wherein the method further comprises:
   determining, based on the determining the plurality of crossfade frames, not to calculate a data size of a subset of the plurality of transition frames as one or more encoded frame types.

6. The method of claim 1, further comprising coding at least one of the first boundary frame or the second boundary frame as an intra-coded frame (I-frame).

7. The method of claim 1, wherein the method further comprises:
   determining, for another transition frame of the plurality of transition frames and based at least on a third weighting factor, a third motion vector associated with the first boundary frame or the second boundary frame; and
   encoding, based at least on the third motion vector, the another transition frame as an inter-predicted frame.

8. The method of claim 1, wherein the method further comprises determining, for another transition frame of the plurality of transition frames, a first weighting factor and a second weighting factor different than the first and the second weighting factors determined for the transition frame.

9. The method of claim 1, wherein the first weighting factor is different than the second weighting factor.

10. The method of claim 1, wherein the method further comprises sending, to a decoder, an intra-coding of the first boundary frame, an intra-coding of the second boundary frame, and the encoded transition frame.

11. The method of claim 1, wherein the determining, based on the first weighting factor, the first motion vector comprises:
   determining a first initial motion vector associated with the first boundary frame; and
   scaling, based on the first weighting factor, the first initial motion vector to produce the first motion vector.

12. A system comprising:
   a first device configured to:
      determine a plurality of crossfade frames, of a content asset, associated with a transition from a first scene to a second scene, wherein the plurality of crossfade frames comprises a first boundary frame associated with the first scene, a second boundary frame associated with the second scene, and a plurality of transition frames;
      determine, for a transition frame of the plurality of transition frames and based on a proximity of the transition frame to the first boundary frame, a first weighting factor;
      determine, for the transition frame and based on a proximity of the transition frame to the second boundary frame, a second weighting factor;
      determine, for the transition frame and based on the first weighting factor, a first motion vector associated with the first boundary frame; and
      determine, for the transition frame and based on the second weighting factor, a second motion vector associated with the second boundary frame;
   a second device configured to:
      receive, from the first device, an indication of the first boundary frame, the second boundary frame, the first weighting factor, and the second weighting factor, and
      encode, based on the first motion vector and the second motion vector, the transition frame as an inter-predicted frame.

13. The system of claim 12, wherein the second device is further configured to encode a plurality of transition frames of the plurality of crossfade frames as inter-predicted frames associated with least one of the first boundary frame or the second boundary frame.

14. The system of claim 12, wherein the first device is configured to determine the weighting factor based on a sequence of the plurality of crossfade frames.

15. The system of claim 12, wherein the indication of the first boundary frame and the second boundary frame comprises an indication to encode at least the portion of the plurality of crossfade frames as inter-predicted frames.

16. The system of claim 12, wherein the second device is further configured to encode, based at least on the indication, at least one of the first boundary frame or the second boundary frame as an intra-coded frame (I-frame).

17. A method comprising:
   receiving an indication of a plurality of crossfade frames, of a content asset, associated with a transition from a first scene to second scene, wherein the plurality of crossfade frames comprises a first boundary frame associated with the first scene, a second boundary frame associated with the second scene, and a plurality of transition frames;
   encoding, based on the indication, the first boundary frame and the second boundary frame as reference frames; and
   encoding, based on a first motion vector and a second motion vector, a transition frame of the plurality of transition frames as an inter-predicted frame, wherein the first motion vector is based on a first weighting factor based on a proximity of the transition frame to the first boundary frame, and wherein the second motion vector is based on a second weighting factor based on a proximity of the transition frame to the second boundary frame.

18. The method of claim 17, wherein the method further comprises determining, based at least on a sequence of the plurality of transition frames, the first weighting factor and the second weighting factor.

19. The method of claim 17, wherein the reference frames comprise intra-coded frames (I-frames).

20. The method of claim 17, wherein the method further comprises receiving an indication of a flash frame of the plurality of frames; and encoding, based on the indication of the flash frame, the flash frame as an inter-predicted frame.

* * * * *